(12) United States Patent
Cioffi et al.

(10) Patent No.: US 7,688,884 B2
(45) Date of Patent: Mar. 30, 2010

(54) VECTORED DSL NESTING

(75) Inventors: John M. Cioffi, Atherton, CA (US);
Georgios Ginis, San Francisco, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 759 days.

(21) Appl. No.: 11/367,930

(22) Filed: Mar. 3, 2006

(65) Prior Publication Data

US 2006/0280238 A1   Dec. 14, 2006

Related U.S. Application Data

(60) Provisional application No. 60/698,113, filed on Jul. 10, 2005, provisional application No. 60/689,659, filed on Jun. 10, 2005.

(51) Int. Cl.
    *H04L 5/16* (2006.01)
(52) U.S. Cl. .............. 375/222; 375/229; 375/230; 375/231; 375/232; 375/233; 370/394
(58) Field of Classification Search .............. 375/222, 375/229, 230, 231, 232, 233; 370/394
See application file for complete search history.

(56) References Cited

U.S. PATENT DOCUMENTS

| 5,181,198 A | 1/1993 | Lechleider |
| 5,479,447 A | 12/1995 | Chow et al. |
| 5,511,119 A | 4/1996 | Lechleider |
| 5,621,768 A | 4/1997 | Lechleider |
| 5,901,205 A | 5/1999 | Smith et al. |
| 6,075,821 A | 6/2000 | Kao et al. |
| 6,134,274 A | 10/2000 | Sankaranarayanan |
| 6,147,963 A | 11/2000 | Walker et al. |
| 6,393,052 B2 | 5/2002 | Sadjadpour et al. |

(Continued)

FOREIGN PATENT DOCUMENTS

DE       4444312       2/1996

(Continued)

OTHER PUBLICATIONS

Cendrillion, Raphael et al., "Improved Linear Crosstalk Precompsensation for DSL".

(Continued)

*Primary Examiner*—David C Payne
*Assistant Examiner*—Nader Bolourchi
(74) *Attorney, Agent, or Firm*—Blakely, Sokoloff, Taylor & Zafman, LLP

(57) ABSTRACT

Methods, apparatus, systems and computer program products address one-sided vectoring systems that include a bonded-line set having two or more bonded DSL lines within a vectored group wherein other techniques such as precoding, tonal predictive GDFEs, tonal rotors and ordering techniques can be implemented. The performance of lines within a bonded set for a single customer can be improved for both upstream and downstream by nesting a vector coding system within, for example, GDFE and/or precoder architectures. The DSL lines within such a bonded group can have rotors applied at both transmit and receive side to achieve higher performance for these lines. The triangular matrix used by the GDFE and the precoder systems of the above-referenced applications can be modified in this context.

30 Claims, 13 Drawing Sheets

U.S. PATENT DOCUMENTS

| | | | |
|---|---|---|---|
| 6,507,608 | B1 | 1/2003 | Norrell |
| 6,597,745 | B1 | 7/2003 | Dowling |
| 6,636,603 | B1 | 10/2003 | Milbrandt |
| 6,744,811 | B1 | 6/2004 | Kantschuk |
| 6,940,973 | B1 | 9/2005 | Yeap et al. |
| 2002/0044610 | A1 | 4/2002 | Jones |
| 2003/0072380 | A1 | 4/2003 | Huang |
| 2003/0086362 | A1 | 5/2003 | Hasegawa et al. |
| 2003/0086514 | A1 | 5/2003 | Ginis et al. |
| 2003/0235245 | A1 | 12/2003 | Erdogan et al. |
| 2004/0086064 | A1 | 5/2004 | Van Acker et al. |
| 2004/0095921 | A1 | 5/2004 | Kerpez |
| 2004/0109546 | A1 | 6/2004 | Fishman |
| 2005/0047323 | A1 | 3/2005 | Clarkson et al. |
| 2005/0052988 | A1 | 3/2005 | Tsatsanis et al. |
| 2005/0053229 | A1 | 3/2005 | Tsatsanis et al. |
| 2005/0123028 | A1 | 6/2005 | Cioffi et al. |
| 2005/0129218 | A1 | 6/2005 | Kimble et al. |
| 2005/0152385 | A1* | 7/2005 | Cioffi ......................... 370/420 |
| 2005/0175078 | A1 | 8/2005 | Redfern |
| 2005/0195892 | A1 | 9/2005 | Ginis et al. |
| 2005/0220179 | A1 | 10/2005 | Tsatsanis |
| 2005/0281229 | A1 | 12/2005 | Girola et al. |
| 2006/0029147 | A1 | 2/2006 | Tsatsanis |
| 2006/0029148 | A1 | 2/2006 | Tsatsanis |
| 2006/0056522 | A1* | 3/2006 | Tsatsanis et al. ............ 375/257 |
| 2006/0109779 | A1 | 5/2006 | Shah et al. |
| 2006/0133519 | A1 | 6/2006 | Tsatsanis et al. |
| 2006/0146945 | A1 | 7/2006 | Chow et al. |

FOREIGN PATENT DOCUMENTS

| | | |
|---|---|---|
| EP | 1207665 | 5/2002 |
| GB | 2315392 | 1/1998 |
| WO | WO-95/31867 | 11/1995 |
| WO | WO-01/35611 | 5/2001 |
| WO | WO-2004/027579 | 4/2004 |
| WO | WO-2005/034459 | 4/2005 |
| WO | WO-2005094052 | 10/2005 |

OTHER PUBLICATIONS

Cendrillion, Raphael et al., "Partial Crosstalk Cancellation Exploiting Line and Tone Selection in VDSL".

Cendrillion, Raphael et al., "Partial Crosstalk Cancellation for Upstream DSL", (2004).

Cendrillion, Raphael et al., "Partial Crosstalk precompensation in downstream DSL", (Apr. 22, 2004).

Cendrillion, Raphael et al., "The Linear Zero-Forcing Crosstalk Canceler is Near-optimal in DSL Channels".

Cheong, Minho et al., "Computationally Efficient Cancellation of Partially-overlapped Crosstalk in Digital Subscriber Lines", (2005).

Cioffi, John M., "Dynamic Spectrum Management".

Cioffi, John M., "Dynamic Spectrum Management Report".

Cioffi, John M., "Spectrum Management with Advancing DSLs".

Cioffi, John et al. "Vectored VDSL (99-559)".

Ginis, George et al., "Alien Crosstalk Cancellation for Multipair Digital Subscriber Line Systems", (2006).

Ilani, Ishai "Crosstalk Cancellation for Multi-Line G.shdsl Systems".

Im, Gi-Hong et al., "FEXT Cancellation for Multi-Carrier Transmission System", (Apr. 11, 2002).

Song, Kee Bong et al., "Dynamic Spectrum Management for Next-Generation DSL Systems", (Oct. 2002).

Voyan Technology, "Vectoring Techniques for Multi-Line 10MDSL Systems".

"International Search Report and Written Opinion", PCT Application No. PCT/US2007/013393, (Jan. 4, 2008).

International Search Report, International Application No. PCT/IB2006/000630 (4 pgs).

Written Opinion of the International Searching Authority, International Application No. PCT/IB2006/000630 (6 pgs).

Ginis et al., "Vectored Transmission for Digital Subscriber Line Systems," IEEE Journal on Selected Areas in Communications; Jun. 2002 (pp. 1085-1104, as provided by International Searching Authority). Reference No. XP-011065493 (20 pgs).

Patent Cooperation Treaty, International Preliminary Report on Patentability and Written Opinion, PCT Application No. PCT/US2007/013393, (Dec. 24, 2008) 8 pages.

"International Search Report", International Application No. PCT/IB2006/000645, 4 pgs. (Aug. 4, 2006).

"International Search Report", International Application No. PCT/IB2006/000499, 4 pgs.(Jun. 19, 2006).

"International Search Report", International Application No. PCT/IB2006/000759, 6 pgs. Aug. 16, 2006).

"International Search Report", International Application No. PCT/IB2006/000884, 5 pgs.(Sep. 4, 2006).

"Invitation to Pay Additional Fees", International Application No. PCT/IB2006/000744, 6 pgs.(Sep. 5, 2006).

Campello, "Practical Bit Loading for DMT", *ICC '99, 1999 IEEE International Conference on Communications*; Conference Record; Vancouver, Canada., XP-000897971, (Jun. 6, 1999), 5 pgs.

Cendrillon, et al., "Improved Linear Crosstalk Precompensation for DSL", *IEEE International Conference on Acoustics, Speech and Signal Processing (ICASSP)*, (Sep. 2004), 4 pgs.

Cendrillon, R, et al., "Improved Linear Crosstalk Precompensation for DSL", *Acoustics, Speech and Signal Processing*, 2004. Piscataway, NJ, US, vol. 4., (May 17, 2004), pp. 1053-1056.

Cendrillon, et al., "Partial Crosstalk Cancellation for Upstream VDSL", *EURASIP Journal on Applied Signaling Processing*, (Oct. 2004), 16 pgs.

Cendrillon, et al., "Partial Crosstalk Precompensation for Downstream VDSL", Published by Elsevier North-Holland, Inc.; vol. 84 issue 11; ISSN:0165-1684, (Nov. 2004), 15 pgs.

Cendrillon, et al., "The Linear Zero-Forcing Crosstalk Canceller is Near-optimal in DSL Channels", *IEEE Global Communications Conference (Globalcom)*; Dallas; Texas, (Dec. 2004), 5 pgs.

Cioffi, John, et al., "Canonical packet transmission on the ISI channel with Gaussian noise", *Global Telecommunications conference 1996*, IEEE, New York, NY, vol. 2, (Nov. 18, 2005), pp. 1405-1410.

Cioffi, John M., et al., "Dynamic Spectrum Management", *A methodology for providing significantly higher broadband capacity to the users*, Telektronik, (Apr. 2004).

Cioffi, John M., "Dynamic Spectrum Management Report", *Committee T1 - Telecommunications Working Group NAI*, San Francisco, California, (Feb. 21, 2005), 75 pgs.

Cioffi, John, et al., "MIMO Channel Measurement Test Plan", (Feb. 17, 2003).

Cioffi, John, "The Fast Adaptive Rotor's RLS Algorithm", *IEEE Transactions on Acoustics, Speech and Signal Processing*, New York, NY, US vol. 38, No. 4, (Apr. 1, 1990), pp. 631-653.

Cuypers, et al., "Combined Per Tone equalization and receiver windowing in DSL receivers", *IEEE International Conference on Acoustics, Speech and Signal Processing (ICASSP)*; Orlando, Florida. (Sep. 2002).

Fang, Jeannie L., "Modeling and Characterization of Copper Access Systems", (May 31, 2002).

Ginis, George, et al., "A Multiuser precoding scheme achieving crosstalk cancellation with application to DSL systems", *Signals, Systems, and Computers*, 200. IEEE vol. 2, (Oct. 29, 2000), pp. 1627-1631.

Ginis, George, et al., "Blind adaptive MIMO decision feedback equalization using givens rotations", *IEEE International Conference on Communications*, New York, NY, US, vol. 1 of 5, (Apr. 28, 2002), pp. 59-63.

Harashima, et al., "Matched-transmission technique for channels with intersymbol interference", *IEEE Transactions on Communication*; vol. COM-20, No. 4, (Aug. 1972), 774-780.

Laroia, et al., "A Simple and Effective Precoding Scheme for Noise Whitening in Intersymbol Inference Channels", *IEEE Trans. on Communication*; vol. 41, (Oct. 1993) 1640-1463.

Lee, et al., "Binder MIMO Channels", *submitted to IEEE Journal on Selected Areas in Communications*, Reference No. XP-001143167, (Jun. 2002), 20 pgs.

Louveaux, et al., "Downstream VDSL Channel Tracking Using Limited Feedback for Crosstalk Precompensated Schemes", *IEEE ICASSP; Philidelphia, Pennsylvania*, (Mar. 2005), 4 pgs.

Magesacher, et al., "Exploiting the Common-Mode Signal in xDSL", *Proc. 12th European Signal Processing Conference (EUSIPCO 2004)*, Vienna, Austria, Sep. 7-10, 2004., (Sep. 2004), 4 pgs.

Otte, M , et al., "Complex CORDIC-like algorithms for linearly constrained MVDR beamforming", *Broadband Communications*, 2000. Piscataway, NJ, US, (Feb. 15, 2000), pp. 97-104

Panigrahi, Saswat, et al., "Fine-Granularity Loading Schemes using Adaptive Reed-Solomon Coding for Discrete Multitone Modulation Systems", (2005).

Papandreou, Nikolaos, "Cooperative Bit-Loading And Fairness Bandwidth Allocation in ADSL Systems",(2003).

Patent Cooperation Treaty, "International Search Report", International Application No. PCT/IB2006/000482, 4 pgs (May 18, 2006).

Patent Cooperation Treaty, "International Search Report and Written Opinion", PCT/IB2006/000630, (Aug. 8, 2006).

Patent Cooperation Treaty, "Written Opinion of the International Search Authority", International Application No. PCT/IB2005/00482, 7 pgs. (May 18, 2006).

Paul, Clayton R., "Analysis of Multiconductor Transmission Lines", *John Wiley & Sons*, Chapters 2 and 3, (1994), 46-186.

Wei, "Generalized Square and Hexagonal Constellations for Intersymbol-Interference Channels with Generalized Tomlinson-Harashima Precoders", *IEEE Transactions on Communications*, vol. 42, No. 9, (Sep. 1994), 9 pgs.

Yu, et al., "Distributed Multiuser Power Control for Digital Subscriber Lines", *IEEE Journal on Selected Areas in Communications*; IEEE Service Center, Piscataway, US; vol. 20, No. 5; ISSN: 0733-8716. Reference No. XP-011065508, (Jun. 2002), 11 pgs.

European Patent Office, "Examination Report," European Application No. 06727343.3, (Jan. 30, 2009).

"Chapter 12 notes for course EE479 taught at Stanford University during Fall 1005", (2005), 47 pgs.

"Chapter 13 notes for course EE479 taught at Stanford University during Fall 1005", (2005), 44 pgs.

"Chapter 14 Notes for course EE479 taught at Stanford University during Fall 2005", (2005), 36 pgs.

"Chapter 15 notes for course EE479 taught at Stanford University during Fall 1005", (2005), 37 pgs.

Papandreou, Nikos, et al., "Real-time FEXT Crosstalk Identification in ADSL Systems", *2003 International Symposium on Intelligent Signal Processing - WISP 2003*, Budapest, Hungary, (Sep. 2003), 6 pgs.

Forouzan, Amir R., "Generalized Iterative Spectrum Balancing and Grouped Vectoring for Maximal Throughput of Digital Subscriber Lines," IEEE Globecom 2005, 2359-2363.

European Patent Office, "Examination Report", European Application No. 07795837.9, (Apr. 1, 2009).

Patent Cooperation Treaty, "International Search Report and Written Opinion", Application No. PCT/IB2006/000824, (Aug. 31, 2006).

Patent Cooperation Treaty, "International Search Report and Written Opinion", Application No. PCT/IB2006/000645, (Aug. 4, 2006).

\* cited by examiner

VECTORED DSL NESTING

CROSS-REFERENCE TO RELATED APPLICATIONS

This application claims the benefit of priority under 35 U.S.C. § 119(e) of the following: U.S. Provisional No. 60/689,659 filed on Jun. 10, 2005, entitled NESTING OF VECTORED DSLS, the entire disclosure of which is incorporated herein by reference in its entirety for all purposes; U.S. Provisional No. 60/698,113 filed on Jul. 10, 2005, entitled DSL SYSTEM, the entire disclosure of which is incorporated herein by reference in its entirety for all purposes; U.S. Ser. No. 11/284,692 filed Nov. 22, 2005, entitled TONAL ROTORS, the entire disclosure of which is incorporated herein by reference in its entirety for all purposes; U.S. Ser. No. 11/336,666 filed Jan. 20, 2006, entitled TONAL PRECODING, the disclosure of which is incorporated herein by reference in its entirety for all purposes; U.S. Ser. No. 11/336,113 filed Jan. 20, 2006, entitled ADAPTIVE GDFE, the entire disclosure of which is incorporated herein by reference in its entirety for all purposes; U.S. Ser. No. 11/344,873 filed Feb. 1, 2006, entitled DSL SYSTEM LOADING AND ORDERING, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

Vectored DSL systems can increase data rate performance by eliminating or reducing crosstalk effects within twisted pairs that belong to the vectored system. In two-sided vectored DSL systems, a number of twisted pairs (also referred to as "loops" and/or "lines") are grouped together, and are used to transmit a single stream of information. In this case, the transceivers of all lines are physically co-located, and they may even share the same hardware or software. Vectoring effectively applies joint signal processing techniques at the transmitters, at the receivers, and/or at both sides.

Two-sided systems are considered to be "single-user" systems, because there is a single information source and a single information sink, despite the multiplicity of lines. In one-sided vectored DSL systems, distinct information streams are transmitted over the lines that comprise the system. Downstream vectoring basically applies transmitter precoding to the signals to be transmitted on the lines, and upstream vectoring similarly applies joint decoding to the signals received on the lines. In such systems, there are as many information sources (and sinks) as there are lines, and the transceivers typically are separated geographically at the customer side (the CPE side). Each line is considered to be a distinct "user" in this case.

In some DSL deployment cases, some customers may use a single line while other customers use multiple (bonded) lines. However, earlier systems have been unable to combine the features of one-sided and two-sided vectored systems, meaning that these hybrid systems have had to forego the benefits of vectoring. In those cases, applying vectoring simultaneously to all lines (both bonded and non-bonded lines) would provide significant performance benefits.

Systems, apparatus, methods and techniques that enable simultaneous vectoring over bonded and non-bonded lines would represent a significant advancement in the art. More specifically, systems, apparatus, methods and techniques for implementing such vectoring over bonded and non-bonded lines would represent a significant advancement in the art.

BRIEF SUMMARY

Embodiments of the present invention provide methods, apparatus, systems, computer program products, etc. to address one-sided vectoring systems that include a set of two or more bonded lines within a vectored group. In embodiments of the present invention, various other techniques such as precoding, tonal predictive GDFEs, tonal rotors and ordering techniques can be implemented.

The performance of lines within a bonded set for a single customer can be improved in both upstream and downstream performance by this invention, which nests a vector coding system within, for example, GDFE and/or precoder architectures. The lines within such a bonded group can have rotors applied at both transmit and receive side to implement higher performance for these lines. The triangular matrix used by the GDFE and the precoder systems of the above-referenced applications can be modified in this context as is detailed within.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
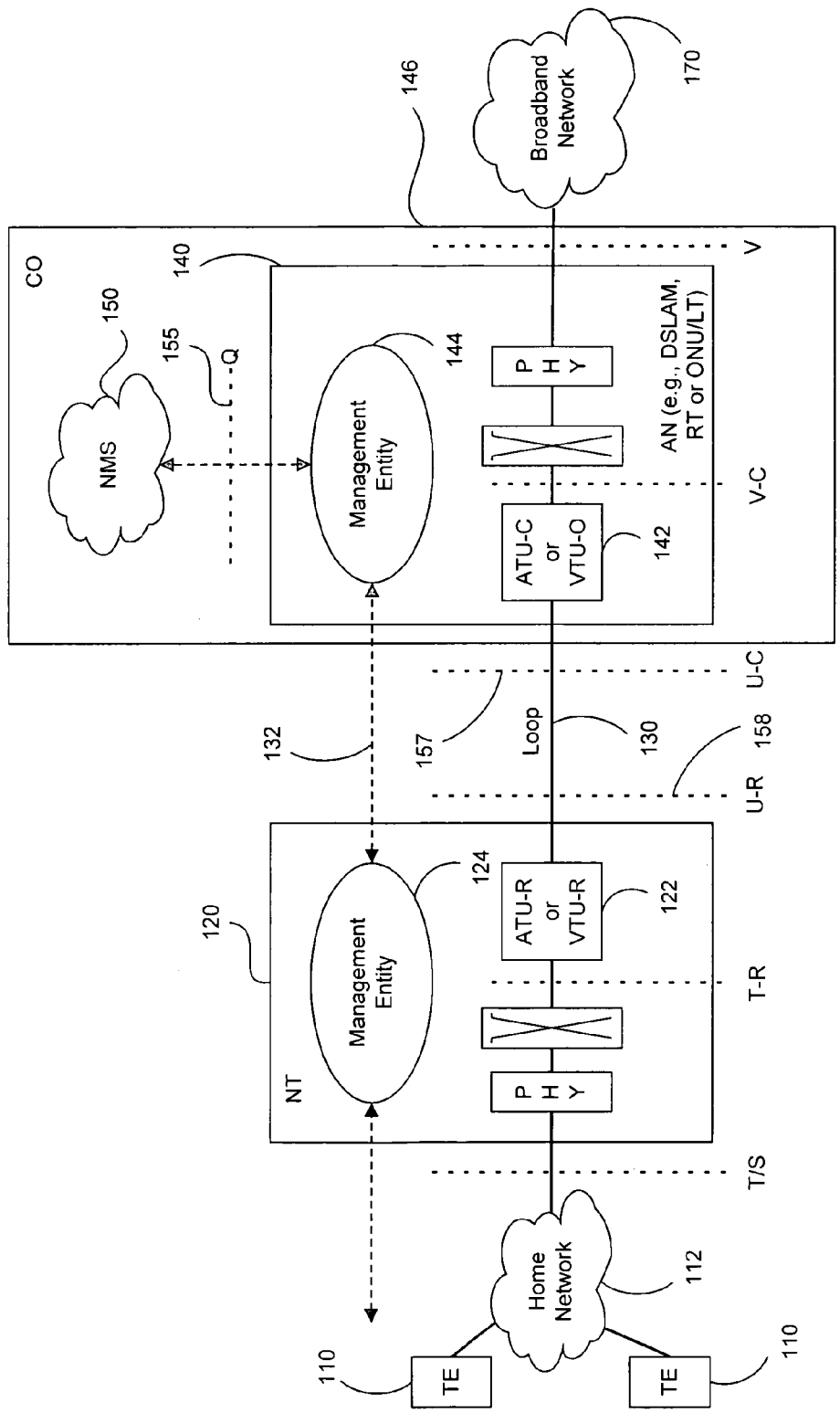
FIG. 1 is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention permit joint or successive decoding (known here as generalized decision feedback equalization, or GDFE) of different users' upstream signals and permit downstream precoding of different users' signals in a one-sided vectored communication system where two or more of the users' lines are bonded. The communication system in which embodiments of the present invention may be used may include ADSL lines, VDSL lines and/or or any other communication system components and/or lines with which the present invention is practical, as will be appreciated by those skilled in the art after reading the present disclosure. For purposes of explanation and illustration, DSL systems are used herein, but the invention is not so limited.

As described in more detail below, implementation of one or more of these nested vectoring systems implementing one or more embodiments of the present invention can be part of a communication device (for example, a controller, DSL optimizer, DSLAM, LT device, RT device, DSL modem and the like). Such implementation may be controlled and/or assisted by a nested vectoring control unit in a local device (again, for example, a DSLAM, LT device, modem, etc.) and/or in a remote device, such as a controller (for example, in or as a DSL optimizer, dynamic spectrum manager or spectrum management center). The nested vectoring control unit can be located anywhere. In some embodiments, a controller having a nested vectoring control unit resides in a DSL CO, while in other cases it may be operated by a third party located outside the CO. The structure, programming and other specific features of a controller and/or nested vectoring control unit usable in connection with embodiments of the present invention will be apparent to those skilled in the art after reviewing the present disclosure.

A controller, such as a DSL optimizer, dynamic-spectrum-management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will be used in connection with one-sided vectored ADSL and/or VDSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS is in some instances also referred to as an Element Management System (EMS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services. In a bonded system, such as those described in U.S. Ser. No. 10/808,771, which is incorporated herein by reference for all purposes, multiple loops 130 can be "bonded" to operate together for a single user, thus providing additional bandwidth to that user. As will be appreciated by those skilled in the art, a bonded-line set also provides the opportunity for improved cancellation of crosstalk that is induced between the bonded lines. Use of this characteristic and the joint optimization of the lines' transmitters in connection with the present invention is explained in more detail below.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL Forum Technical Report TR-069, entitled "CPE WAN Management Protocol," dated May 2004. Finally, DSL Forum Technical Report TR-064, entitled "LAN-Side DSL CPE Configuration Specification" from the DSL Forum, dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the following discussion of DSL systems may be extended to ADSL because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
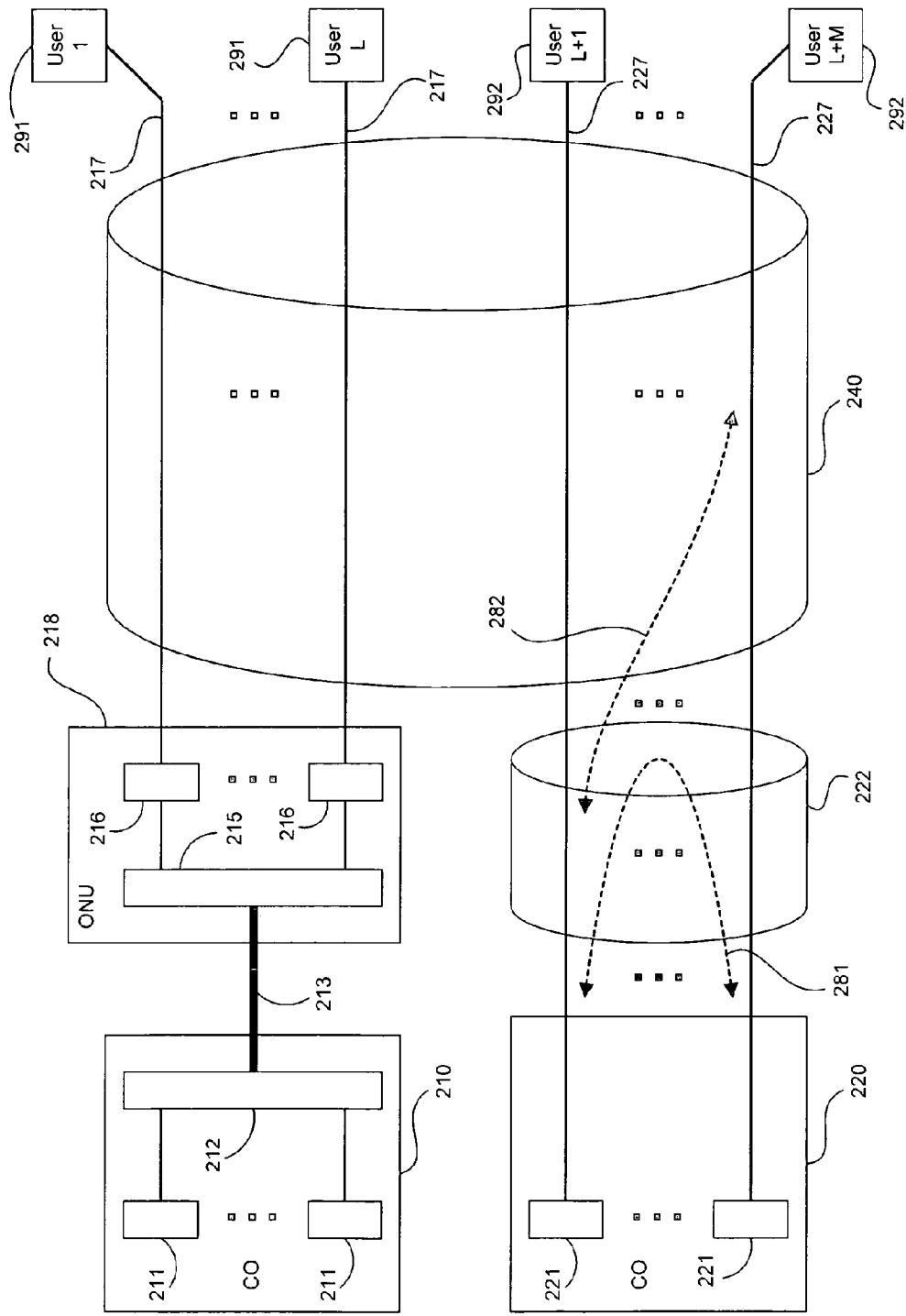
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. Moreover, FTT-Cab is expected to become an increasingly popular topology. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder. The crosstalk noises created by lines terminating at different places usually cannot be canceled directly by well-known decision-feedback mechanisms and instead represent time-varying spatial noises that can be completely or partially canceled by the invention described herein.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

A vectored DMT channel (both upstream and downstream) is characterized in synchronized digitally duplexed DSL systems by the simple matrix equation:

$$Y = HX + N \qquad \text{Equation (1)}$$

where H (also denoted H as well) is a matrix that describes the insertion loss and crosstalk on a single tone and depends on the number of inputs and outputs used, including non-square versions of H when special channels such as phantom-mode signal channels are used. H is usually a square matrix that is size U×U for differential-only vectoring and (2U−1)×(2U−1) in full, two-sided vectoring with phantom-mode signals. For one-sided systems that use phantoms, any combination of an extra U modes may be assigned to either of (but not both) the downstream or upstream vectoring calculations. H may be a different matrix for each tone and usually is not the same in upstream and downstream directions. A single H is used in this disclosure to simplify notation. A complex rotor computational unit may apply one or more complex rotors to each such tone in either direction independently, as described in more detail below.

In an upstream transmission direction, such as those found in DSL systems where data is transmitted to a DSLAM, RT device, LT device, etc., there is a factorization of the noise-whitened equivalent channel as $$R_{nn}^{-1/2} \cdot H = \overline{QSG} \qquad \text{Eq. (2)}$$

and the channel without noise whitening as $$H = QR \qquad \text{Eq. (3)}$$

Both of these factorizations produce triangular matrices on the right. In embodiments of the present invention, the triangularity becomes a block triangularity (and not perfectly triangular) in positions corresponding to bonded lines. An example of such a triangular matrix appears in Equation 4 below, with 3 users and 4 lines. Note that there is one non-zero term above the diagonal (x signifies an entry that is possibly non-zero but not of direct interest here.

$$R = \begin{bmatrix} r_{11} & 0 & 0 & 0 \\ x & r_{22} & r_{23} & 0 \\ x & r_{32} & r_{33} & 0 \\ x & x & x & r_{44} \end{bmatrix} \qquad \text{Eq. (4)}$$

The 2×2 matrix in the middle can be called $R_{22}$ so $$\begin{bmatrix} r_{11} & 0 & 0 \\ x & R_{22} & 0 \\ x & x & r_{33} \end{bmatrix} \qquad \text{Eq. (5)}$$

While the matrix could be triangularized, leaving it as a block matrix corresponding to the bonded lines in QR factorization (basically one step in QR factorization that would zero the entry $r_{23}$ of Equation (4) is omitted) allows higher performance since the transmitters of the two lines can be jointly optimized in the bonded system. That optimization in this invention executes appropriate block line processing or the like (for example, singular value decomposition (SVD)) of the middle matrix as $$R_{22}=F_2A_2M^*_2 \qquad \text{Eq. (6)}$$

Decisions within a bonded-line set are not fed back for crosstalk cancellation for that bonded-line set since this is inherently accomplished using the noted SVD/block line processing for the bonded lines. The decisions from that entire bonded-line set are fed back for use in the noise predictor for all lines and the feedback sections for other, non-bonded lines that follow the bonded group in the decoding order. The M matrix, which can be implemented in the transmitter because the bonded lines are within a single transmitter, separates the crosstalk and allows a higher performance. Such an SVD (or other block line processing) can be implemented by a controller such as a DSL optimizer for each and every bonded-line set to get the corresponding M and F matrices (which are orthogonal). The M and F matrices can be translated into a series of rotations, for example as disclosed in U.S. Ser. No. 11/284,692, incorporated by reference above, can then be found for implementation of either as a series of rotations.

The $A^{-1}$ is a diagonal matrix that can be easily implemented within the receiver (separate from the rotors) with minimal complexity. The matrix A is used in determining the gains that are used in all bit-swapping and loading algorithms for the lines in the bonded set (this A will be a function of the order chosen and thus the other lines preceding and succeeding this set in decoding; ordering for precoding and decoding can be selected in any suitable fashion, including according to one or more embodiments disclosed in U.S. Ser. No. 11/344,873, incorporated by reference above. Moreover, other techniques relating to ordering and related matters can be found in course notes for EE479 taught at Stanford University during Fall 2005; Chapters 12, 13, 14 and 15 of those notes are incorporated herein by reference in its entirety for all purposes).

These gains will be at least as high as if the additional coordination among the bonded lines at the transmitter was not exploited. Note that, in the event that rotations are used to implement the M matrix in the transmitter, a rotor unit may now be employed with the bonded transmitters at the client (NT) side of the DSL system. Any ordering algorithm remains the same, simply with the new, better gains for the bonded set always used in place of those that would have arisen without bonding.

The feedback section can use instantaneous decisions on other previously decoded users (from the same DMT symbol) as inputs to the feedback section. This process can reset every symbol, thus limiting error propagation with such instantaneous decisions to the current symbol. Therefore, error propagation is not as serious an issue as in time-domain decision feedback systems where, error bursts can last a long time (especially when outer trellis and/or RS codes are used to improve coding gain). In DMT, and in particular with trellis coding that is applied independently to each of the users' tones in succession within a single symbol, significant gain in performance with the tonal GDFE is possible if soft-information is derived from the "decision-device" input. Other users' decisions will affect such soft-information, which can in turn be passed to the decoder for the trellis code of each user (which runs along the tones and terminates itself each symbol). The net effect is that other users' codes can help eliminate any errors on a current user and vice versa. The ultimate maximum a posteriori decoder limit can correspond to considerably higher coding gain than a single trellis code alone (but of course never exceeding the capacity limit).

Vector-DMT with a GDFE receiver already has large performance gain to non-vectored receivers when FEXT is significant. The extra iterative decoding gain (0-2 dB) may be attained, but at perhaps a trade-off in the complexity of the iterative decoding that is higher than desired.

Figure 3:
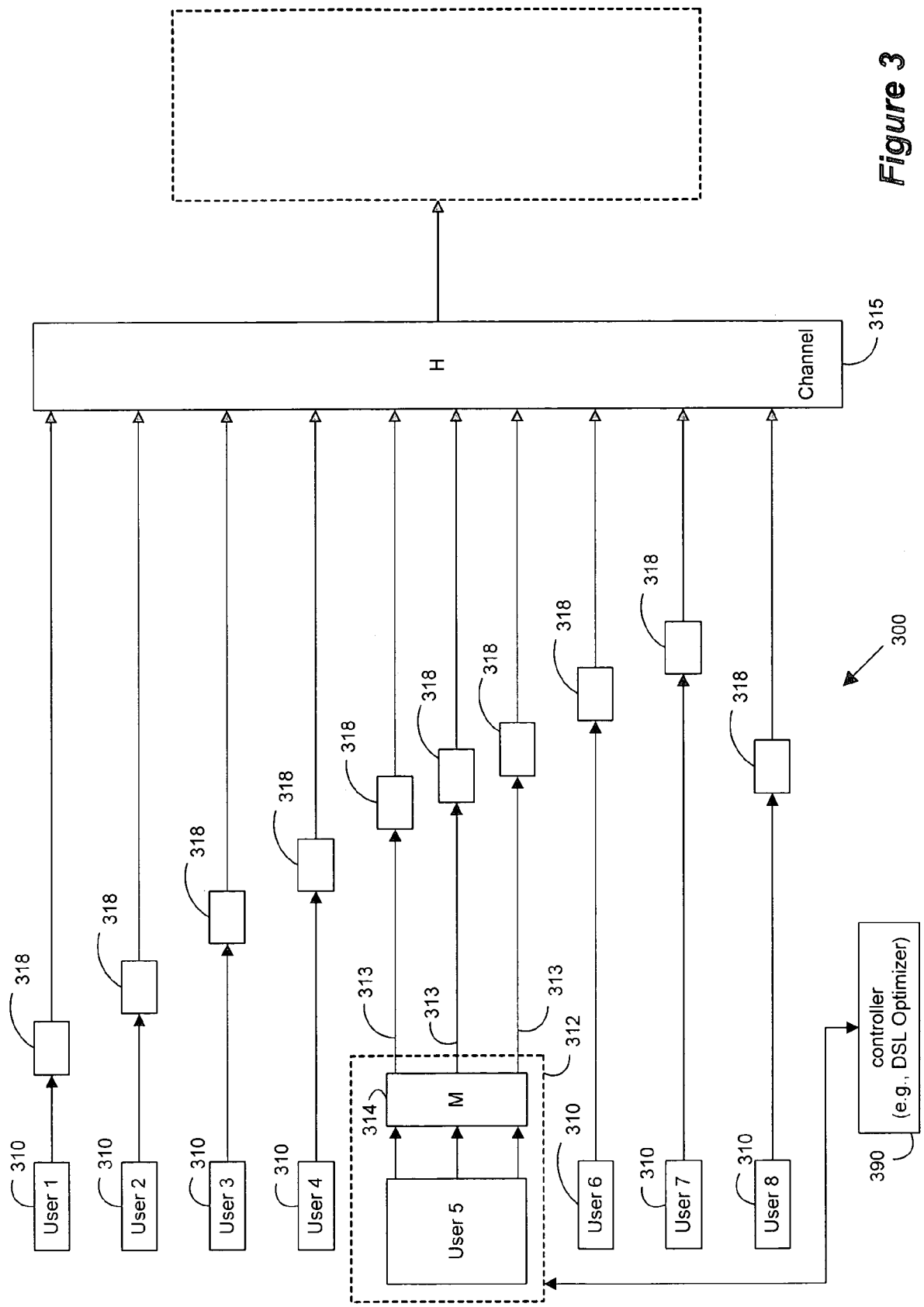
FIG. 3 is a block diagram illustrating upstream data transmission with vectored DSL nesting according to one or more embodiments of the present invention.

An example of the present invention is shown in the system diagram of FIG. 3. A DSL upstream transmission configuration 300 includes a number of users' lines. In the example shown in FIG. 3, there are 7 single line users 310 (Users 1-4 and 6-8). Another user 312, User 5, has a bonded system employing 3 bonded DSL lines 313. Data transmitted by the users 310, 312 traverses channel H 315. As will be appreciated by those skilled in the art, DMT data from users 1-4 and 6-8 will be processed by modules 318 (transmit processing) before being transmitted on the channel. The DMT data from user 312 is treated differently, however. The DMT data corresponding to the three bonded-lines 313 are jointly filtered by a feedforward filter 314 (for example, matrix M) before being processed by the transmit processing modules 318. The configuration and operation of module 314 may be controlled by a controller 390 (for example, a DSL Optimizer, DSM center, etc.). As will be appreciated by those skilled in the art, the transmit processing modules 318 may perform operations such as IFFT, parallel to serial conversion, cyclic extension addition, windowing, filtering, interpolation, and digital to analog conversion.

Figure 5:
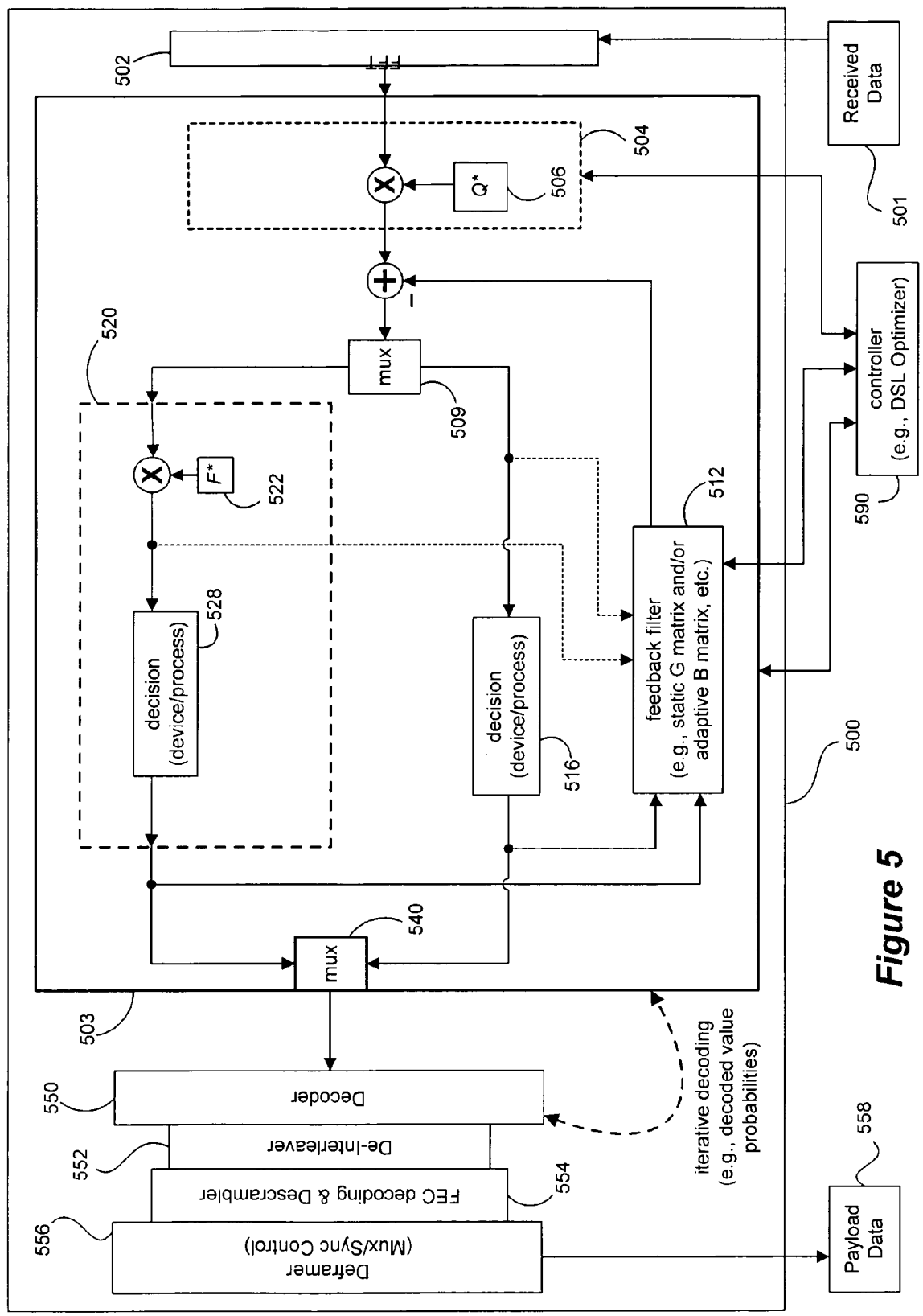
FIG. 5 is a block diagram illustrating upstream data reception with vectored DSL nesting according to one or more embodiments of the present invention.

The specific operation and at least one implementation of a receiver 500 using embodiments of the present invention is seen in FIG. 5. The receiver 500 receives received data 501, such as multi-user data in a vectored DMT DSL system. The receiver may apply some preprocessing such as an FFT 502 and/or the like, as will be appreciated by those skilled in the art, before sending data to an upstream multi-user data processing unit 503. Within unit 503 an "all-data" processing unit 504 can process both bonded-line data as well as data from one or more non-bonded lines (a "non-bonded" line is a single line with a single user and the terms "single line" and "non-bonded line" may be used interchangeably herein) in the multi-user data packet. In some vectored DSL systems, this feedforward filter can apply a Q* matrix 506 or its equivalent, as disclosed in U.S. Ser. No. 11/336,113, incorporated by reference above. As taught by U.S. Ser. No. 11/284,692, the matrix 506 (as well as other matrices, such as matrix 522 of FIG. 5 and the transmitter M matrix of FIG. 3) can be implemented as one or more complex rotors in appropriate locations, as will be appreciated by those skilled in the art.

The data processing sequence from this point forward is dictated by the ordering of the users. The output of the feedback filter 512, if any, is subtracted from the data for each line from the processing unit 504. Such subtraction achieves crosstalk cancellation and/or noise decorrelation. Following the subtraction, a multiplexer 509 directs the data either to a decision device 516 (for non-bonded lines), or to a bonded-line set processing unit 520 (for bonded lines).

If the data corresponds to a non-bonded line, then the output of the decision device 516 is passed to a multiplexer 540 and consequently to the remaining decoder stages of the receiver 500. The remaining stages of the receiver may include trellis decoding 550, de-interleaving 552, FEC decoding and descrambling 554 and deframing 556, after which payload data 558 can be delivered to an appropriate destination. Iterative decoding may also be used between decoder 550 and multi-user data processing unit 503. The output of the decision device 516 also is passed as input to the feedback filter 512. Optionally, the input to the decision device 516 may be passed as input to the feedback filter 512 to allow alternative approaches for feedback filtering implementation (for example, adaptive feedback filtering using error predictors and the like).

If the data at multiplexer 509 corresponds to a bonded-line set, then the data is sent to bonded-line set processing unit 520 where the input is first filtered by a feedforward matrix 522 (for example, using an F* matrix or the like, which can be implemented using tonal rotors, as described in one or more of the referenced patent applications). The output of the feedforward filtering is provided to a decision device 528, which outputs data that is passed to the multiplexer 540 and consequently to the remaining decoder stages of the receiver 500. The output of the decision device 528 also is passed as input to the feedback filter 512. Optionally, the input to the decision device 528 may be passed as input to the feedback filter 512 to allow alternative approaches for feedback filtering implementation, as noted above.

A controller 590 (such a DSL Optimizer) may be coupled to unit 503, unit 504, feedback filter 512, etc. and may aid with the configuration of the various modules such as the feedforward filters 506 and 522, the feedback filter 512, and the ordering of the users/lines as imposed by the multiplexing operations 509 and 540 (some of which might be found in U.S. Ser. No. 11/344,873, incorporated by reference, above). Again, other techniques relating to ordering and related matters can be found in course notes for Chapters 12-15 of EE479 taught at Stanford University during Fall 2005, incorporated by reference above.

As with other upstream decoding systems, a feedforward filter can be used to apply the Q* matrix filtering 506 to the received multi-user data, as illustrated in FIG. 5. In the embodiment of the present invention shown in FIG. 5, a GDFE can apply a feedback filter 512 either to achieve crosstalk cancellation or to achieve noise prediction or to achieve both. As will be appreciated by those skilled in the art, other filtering and/or data processing can be applied, as appropriate. For example, the feedback filter 512 may or may not be applied. Feedback filter 512 can be configured to remove crosstalk from non-bonded-line signals as disclosed in U.S. Ser. No. 11/336,113, incorporated by reference above. Likewise, feedback filter 512 can remove noise from the multi-user data, again as taught in that same application.

In embodiments of this invention, feedforward and feedback filters can be realized as static filters, as adaptive filters (to take into account channel and noise changes), or as one or more combinations of static and adaptive filters. Other embodiments of a receiver using embodiments of the present invention are available, as will be appreciated by those skilled in the art.

Figure 4A:
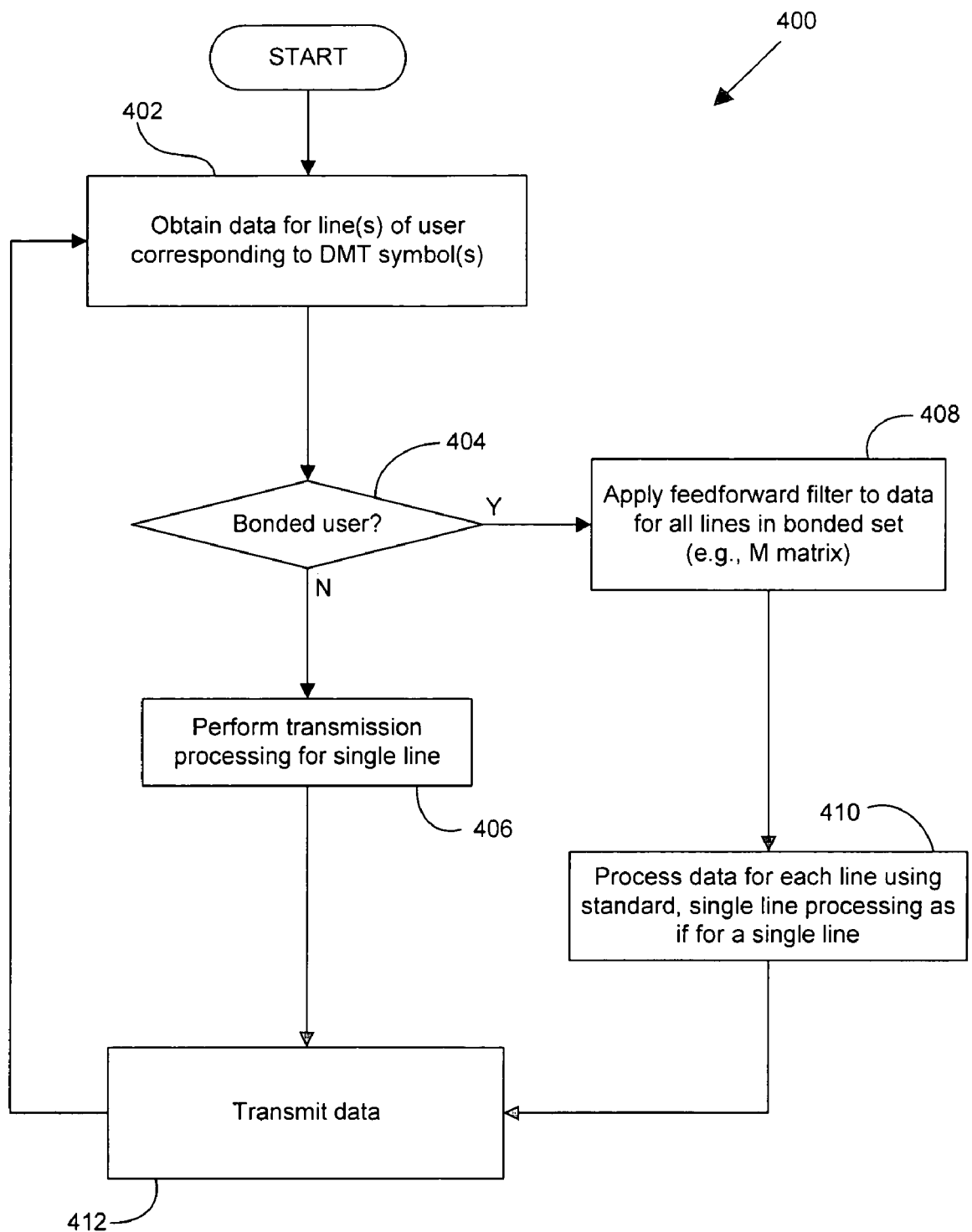
FIG. 4A is a flow diagram illustrating upstream data transmission with vectored DSL nesting according to one or more embodiments of the present invention.

One process 400 of signal transmission according to one or more embodiments of this invention (as a method, per se, and/or implementation in a computer program product) is shown in FIG. 4A. User data are obtained at 402 corresponding to the line (or lines when bonding is used) of the user of interest. An evaluation is made at 404 to determine whether this is a bonded-line set user or a single-line user. If the data are not from a bonded-line set user, then the user data are processed for transmission at 406 using single line processing. These single line processed data are then transmitted on the line at 412. If the user has bonded lines, then the processing differs. The data corresponding to all lines of the bonded user are processed by applying feedforward filtering at 408 (for example, by a matrix M). After applying such filtering, standard single line transmitter processing is applied to each of the lines at 410, and finally the processed data are transmitted on the line at 412. The process 400 may then repeat for a new set of user data obtained at 402.

Figure 4B:
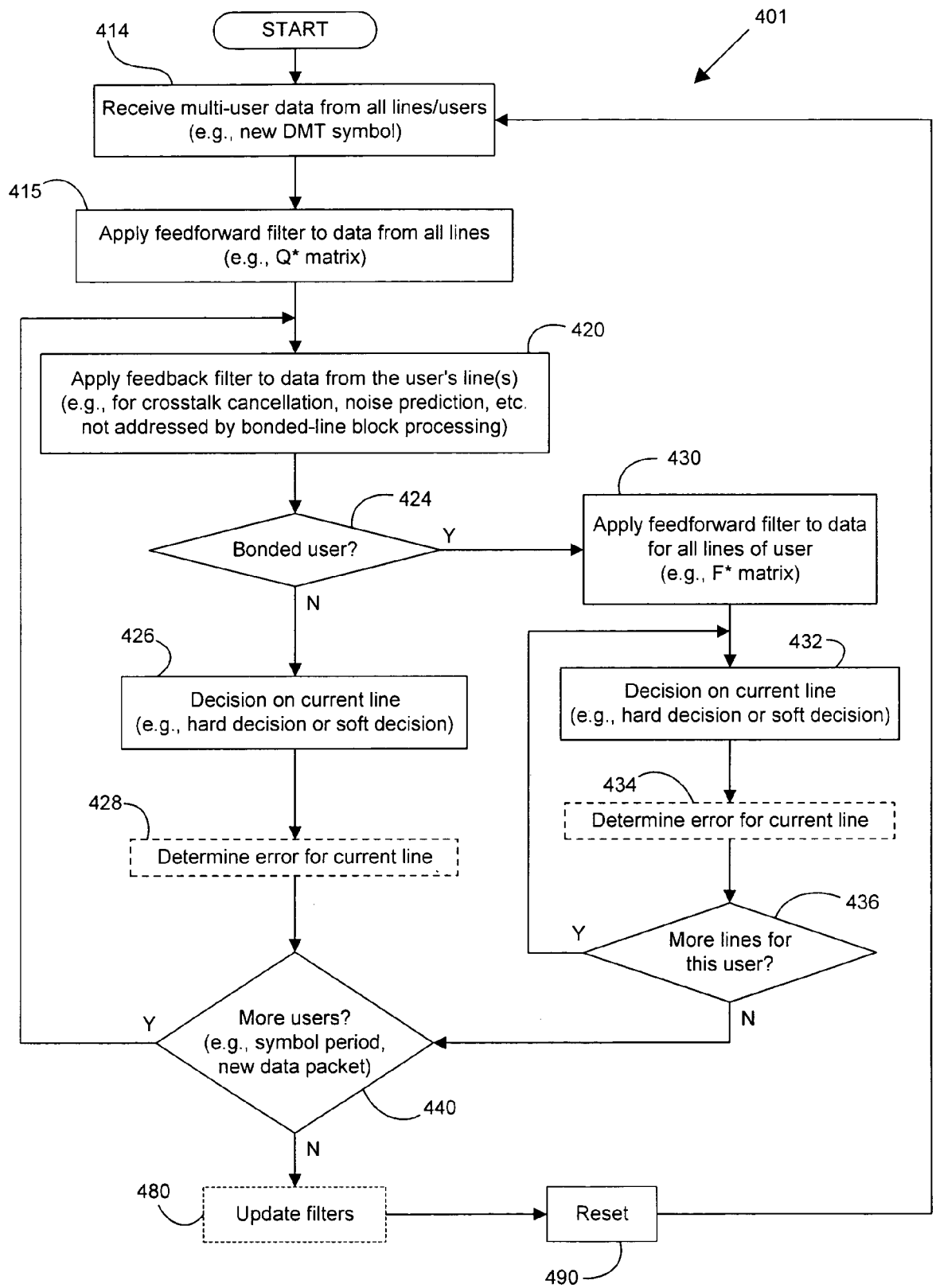
FIG. 4B is a flow diagram illustrating upstream data reception with vectored DSL nesting according to one or more embodiments of the present invention.

Process 401 of FIG. 4B illustrates signal reception according to one or more embodiments of this invention (as a method, per se, and/or implementation in a computer program product or the like). User data are received at 414 from all lines (including bonded and non-bonded lines). The data received at 414 are assumed to have undergone standard receiver processing, which may include filtering, analog to digital conversion, decimation, cyclic extension removal, windowing and FFT processing. The user data from all lines undergo feedforward filtering at 415 (for example, by a matrix Q*). Feedback filtering 420 is then performed on each user's data sequentially. Such feedback filtering can be used to cancel crosstalk and/or decorrelate noise. An evaluation is performed at 424 to determine whether the user data under consideration belongs to a bonded-line set or not. If the user at 424 is a single line user, then a decision can be made at 426 for the line's data. After making a decision, an error metric may be estimated at 428, for example by comparing the data before and after the decision. After any error metric calculation, processing of the single line data proceeds to 440.

If the user at 424 is a bonded-line set user, then feedforward filtering 430 (for example, by multiplying by F*) is applied to the data from lines belonging to the bonded-line set. Even if the lines of a bonded user are not consecutive in the ordering used by a receiver, those skilled in the art will understand that a bonded-line set user's lines can be grouped for this processing without loss of generality. Following the application of such feedforward filtering, a decision is made at 432 for each of the bonded lines sequentially, optionally followed by the generation of an error metric at 434 for each of the bonded lines. An evaluation at 436 determines whether all lines of the bonded-line set have been processed. If all lines have been processed, then the bonded-line set user's data has been fully processed and the process 401 proceeds to 440; otherwise, it returns to 432. The decisions performed at 426 and 432 may be soft decisions and, as known to those skilled in the art, iterative decoding may be applied to improve the reliability of such decisions.

Note that no receiver feedback filtering is applied between lines in the bonded-line set (that is, after decision 424) because crosstalk between bonded lines in the same bonded-line set is removed using the block processing of the present invention. Such filtering is not needed, because the combination of receiver feedforward filtering 430 and transmitter feedforward filtering 408 (from FIG. 4A) should result in a crosstalk-free channel with no noise correlation. If the transmitter feedforward filtering 408 is not performed correctly, then receiver feedback filtering would be needed for the data from lines of the bonded-line set.

A decision is made at 440 regarding whether all users' data have been processed. If data from users remain to be processed, the next step is to restart feedback filtering for the next user's line(s) at 420. If all users have been processed, then a filter update operation can take place at 480, if desired. This operation can involve using error metrics computed at 428 and/or 434 to update the receiver feedforward and/or feedback filters used at 415, 420 and 430. Additionally, the transmitter feedforward filter used at 403 of FIG. 4A may be updated. Such update can be performed by a controller, such as a DSL Optimizer, or DSM Center. Finally, after the update, the process terminates and is reset at 490 for receiving the next tone, DMT symbol or other multi-user data at 414.

Corresponding downstream precoder modifications are illustrated in exemplary embodiments in FIGS. 6A, 6B, 7A and 7B. The transmit configuration of a downstream transmitter is augmented by addition of the matrix M (or any other appropriate block line processing usable with bonded lines), which can be implemented as matrix multiplication, a complex rotor unit, etc. on the bonded lines (such implementation may be referred to generally as "filtering" or "processing" or the like here and elsewhere in the present disclosure and such terms are intended to include the enumerated implementations as well as any other known and/or apparent to those skilled in the art).

In the receivers, the non-bonded lines can have individual scaling, as taught in U.S. Ser. No. 11/336,666, incorporated by reference above, with modulo devices. The bonded-line receiver implements the F* matrix (for example, by matrix multiplication, a complex rotor unit, or other filtering or processing), followed by diagonal scaling using the $A^{-1}$ matrix or the like. The precoder does not use preceding crosstalk-removal feedback within the bonded lines, and the precoding of the non-bonded lines is determined by the rest of the R matrix, just as in the GDFE case (without a noise predictor). Modulo addition is for the constellation size on each of the individual bonded lines, and a similar device may be used (as disclosed in U.S. Ser. No. 11/336,666) on each of the final output lines in the receiver. A dither signal also may be employed as needed or appropriate (as disclosed in U.S. Ser. No. 11/336,666).

Figure 6A:
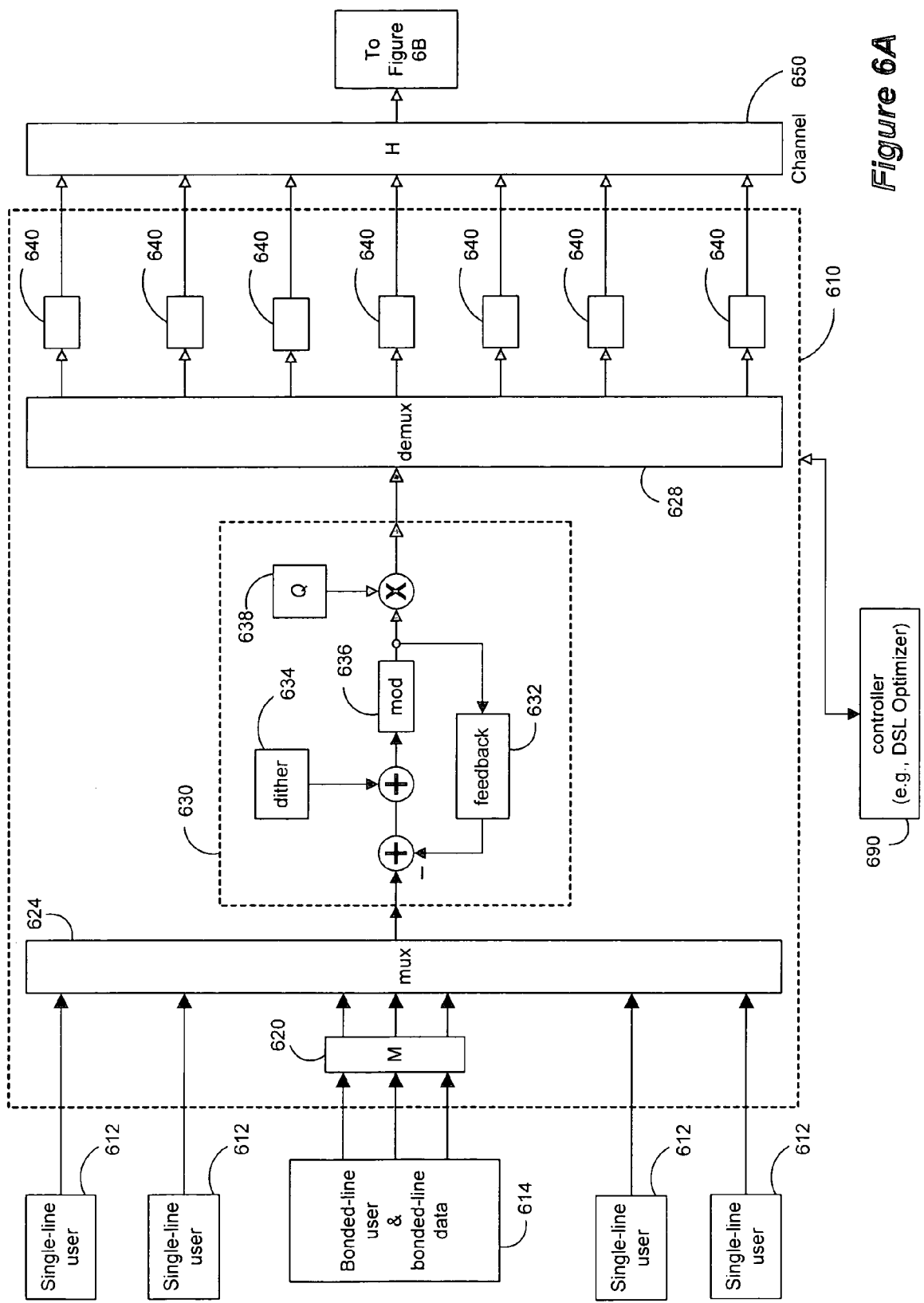
FIG. 6A is a block diagram illustrating downstream data transmission with vectored DSL nesting according to one or more embodiments of the present invention.

One or more embodiments of the present invention implemented in a downstream DSL transmission configuration are shown in the system diagram of FIG. 6A. The example of FIG. 6A will be explained further in connection with the transmission of multi-user data such as DMT symbols.

A number of single-line user-data lines 612 (constituting a non-bonded-line set) and one bonded-line set user 614 (that is, two or more bonded user-data lines) provide data for downstream transmission to a transmitter module 610, which may be part of a whole transmitter, transceiver, etc. of some sort. The data corresponding to each line (whether bonded or non-bonded) may undergo appropriate encoding operations such as framing, FEC encoding and scrambling, interleaving, constellation encoding and gain scaling. Bonded-line data from user 614 is provided to a bonded-line preceding unit 620 for application of appropriate bonded-line precoding, for example using an M matrix as described above. Bonded-line preceding unit 620 is shown as being part of module 610, though such bonded-line precoding can be performed anywhere that is convenient and/or appropriate, as will be appreciated by those skilled in the art. Output data from the bonded-line precoding unit 620 and data from the non-bonded lines are combined, for example, by a multiplexer 624 to consequently process data at precoder 630.

The data corresponding to a line at the output of multiplexer 624 are then precoded by the precoder 630. Such preceding may be performed in any appropriate manner, for example according to one or more embodiments taught by U.S. Provisional Application entitled "TONAL PRECODING" 60/686,751, referenced above. The exemplary precoding of unit 630 includes subtraction of the output of a feedback filter 632, addition of an optional dither signal 634, and application of a modulo operation 636, though one or more of these precoding steps may be omitted, as will be appreciated by those skilled in the art. Initially processed data is provided as input to the feedback filter 632. After data from all lines have been processed, a feedforward filter 638 may then be applied, for example, by multiplying the data by a matrix Q. Following the multiplication, the data of each line are separated by a device such as a demultiplexer 628. Finally, the data of each line undergo otherwise standard transmit processing 640. As known to those skilled in the art the transmit processing modules 640 may perform operations such as IFFT, parallel to serial conversion, cyclic extension addition, windowing, filtering, interpolation, and digital to analog conversion. Fully processed transmission data can then be transmitted downstream over a channel H 650.

The processing steps for performing bonded-line and non-bonded-line preceding are performed by transmitter module 610 as described in connection with FIG. 6A. One or more of these components may be coupled to a controller 690, such as a DSL optimizer, or DSM center. Such a controller may configure programmable elements of unit 620, the transmitter module 610 and/or precoder 630, such as the feedforward filter of unit 620 and 638, the feedback filter 632, the optional dither signal 634, and the optional modulo operation 636. Such a controller may also configure ordering of the users and the lines as imposed by the multiplexing operations performed at 624 and 628. Ordering can be selected in any suitable fashion, including according to one or more embodiments disclosed in U.S. Ser. No. 11/344,873, incorporated by reference above. Again, other techniques relating to ordering and related matters can be found in course notes for Chapters 12-15 of EE479 taught at Stanford University during Fall 2005, incorporated by reference above.

Figure 6B:
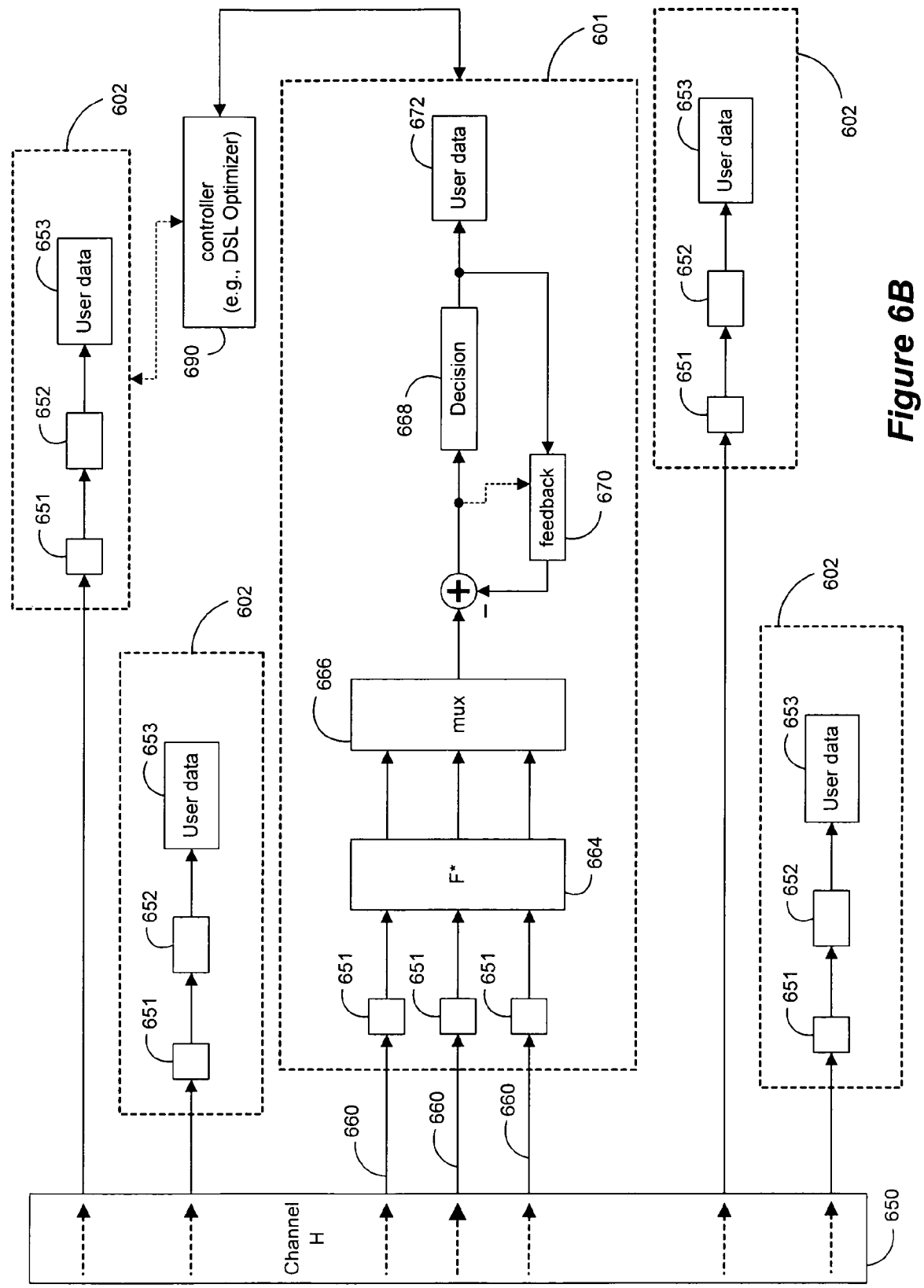
FIG. 6B is a block diagram illustrating downstream data reception with vectored DSL nesting according to one or more embodiments of the present invention.

The system diagram of FIG. 6B shows a bonded-line set receiver 601 according to one or more embodiments of the present invention. Signals are received from channel H 650. The signals for non-bonded lines are sent to standard receivers 602 in which standard reception processing 651 (for example, operations such as filtering, analog to digital conversion, decimation, cyclic extension removal, windowing, serial to parallel conversion and FFT processing) and decoding 652 (for example, operations such as trellis decoding, de-interleaving, FEC decoding and descrambling, and deframing) are performed to yield single line user data 653.

In the bonded-line set situation, receiver 601 receives signals on the three bonded lines 660. The data on these lines 660 are processed using standard reception processing 651 initially. The data over each line is receiver processed by modules 651 in similar fashion to the processing performed for data of single line users. The data from all bonded lines in this user's bonded-line set are filtered at 664, per the line set's SVD and/or other block line processing, for example by applying an F* matrix (and possibly an $A^{-1}$ matrix, if appropriate). This can be done using appropriate techniques such as matrix multiplication, complex rotations, etc. In some embodiments of the present invention, the filtered data is then provided (for example, by means of a multiplexer 666) for noise removal. The output of a feedback filter 670 is subtracted from the data of each line to reduce the noise. After such subtraction, the subtracted data are decoded using a decision device 668. The decoded data are finally provided as payload data for the user at module 672. The output of the decision device 668 is also provided as input to the feedback filter 670. Optionally, the input to the decision device 668 is also provided as input to the feedback filter 670 to allow an alternative feedback filter 670 implementation as will be appreciated to those skilled in the art.

In the above description the decision device 668 may or may not include operations such as trellis decoding, de-interleaving, FEC decoding and descrambling, and deframing. In some embodiments, the decision device 668 may only produce soft decisions, in which case some of the decoding operations are performed by module 672 before the data are provided as payload data. As will be appreciated to those skilled in the art, iterative decoding techniques may be used to realize some performance gains. The bonded-line receiver 601 may be coupled to a controller 690. Such a controller may be used to monitor operation and to configure programmable modules of the receiver 601, such as the feedforward filter 664, the feedback filter 670 and the multiplexer 666.

Error metrics for each line can be produced (for example, in filter 670) by comparing the input and output of decision device 668. Such metrics can be used to update aspects of receiver 601, such as modules 664 and 670. Such updating can be performed either directly or indirectly through a controller 690. When a controller 690 is used for updating, the controller may also use error metrics from lines corresponding to single-line users and computed at decoders 652. Such a controller also may perform updating of modules in the transmission configuration of FIG. 6A to allow the most reliable transmission when channel and/or noise change over the lines.

Figure 7A:
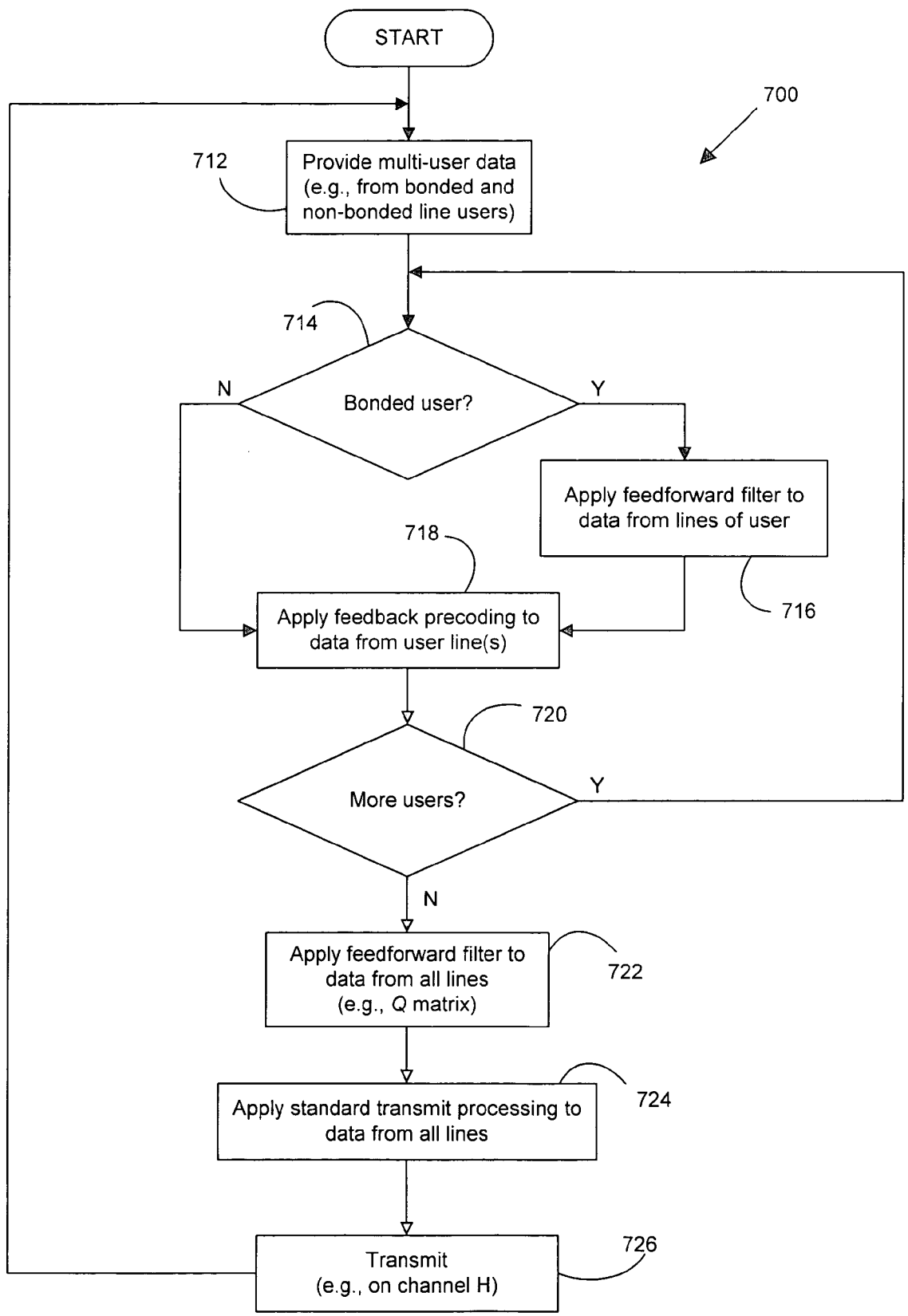
FIG. 7A is a flow diagram illustrating downstream data transmission with vectored DSL nesting according to one or more embodiments of the present invention.

A process for signal transmission using one or more embodiments of a downstream system according to the present invention (for example, a method and/or implementation in a computer program product or the like) is shown in FIG. 7A. Process 700 begins at 712 with multi-user data being provided which, in the case of a vectored DMT DSL system, could be a DMT symbol made up of data from one or more non-bonded lines and a plurality of bonded lines comprising one or more bonded-line sets. A decision is made at 714 as to whether given data is from a bonded user or a non-bonded user. If the data is from a bonded user, then a feedforward filter is applied to data of all lines of the user at 716. If the data is from a non-bonded user, then no such processing takes place. At 718, feedback precoding is applied to the data from the line (or lines) of the current user, regardless of bonded-line status. Another decision is made at 720 as to whether data from all users have been processed. If data remain to be processed, the process returns to 714. If all users' data has been processed, then a feedforward filter is applied to the data from all lines at 722 (for example, a Q matrix), after which standard transmit processing is applied to the data of each line at 724 (for example, operations such as IFFT, parallel to serial conversion, cyclic extension addition, windowing, filtering, interpolation, and digital to analog conversion). Finally, the data of each line are transmitted at 726.

Figure 7B:
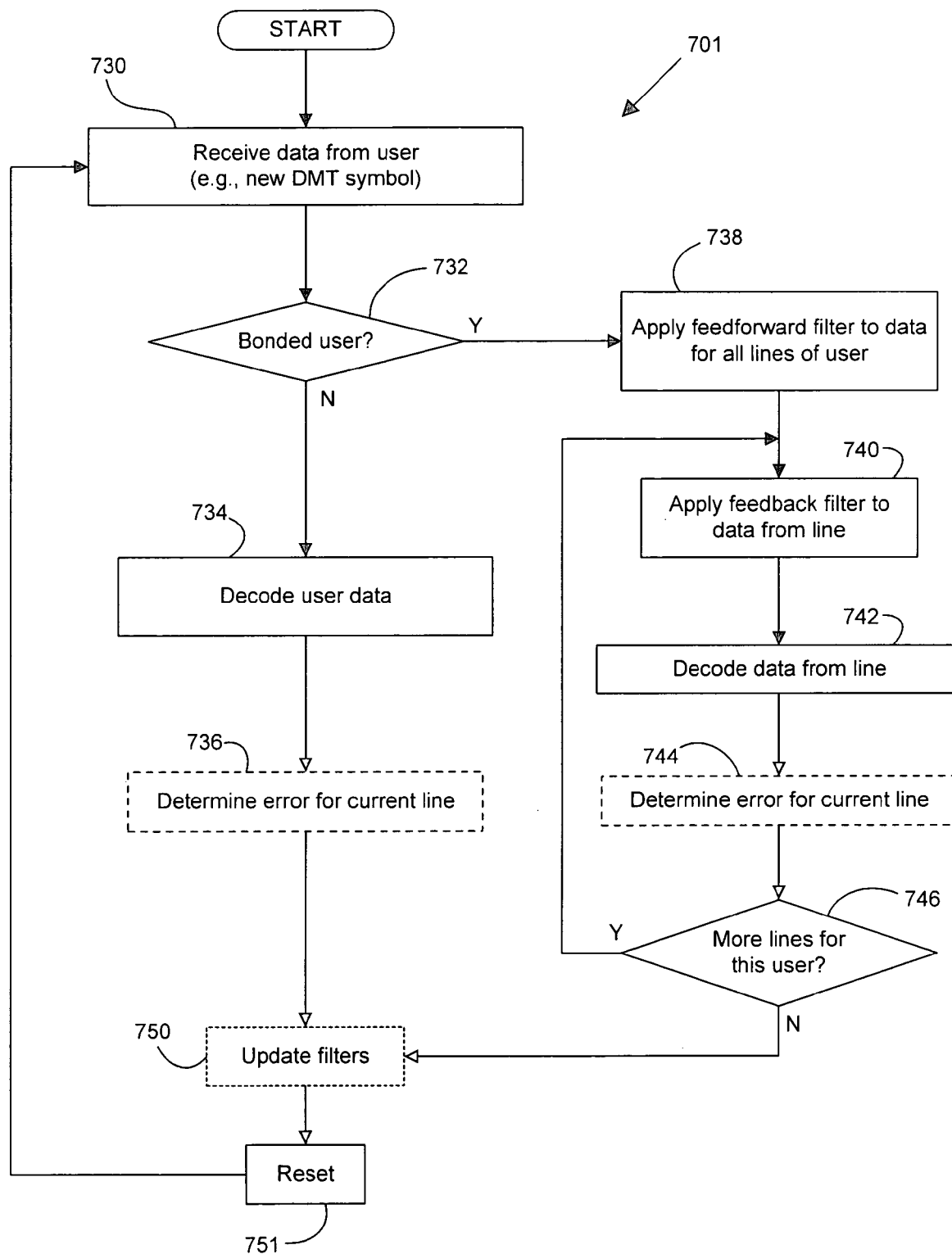
FIG. 7B is a flow diagram illustrating downstream data reception with vectored DSL nesting according to one or more embodiments of the present invention.

A process for signal reception using one or more embodiments of a downstream system according to the present invention (for example, a method and/or implementation in a computer program product or the like) is shown in FIG. 7B. Process 701 begins at 720 with receiving data from the line (or line set) used by the user. A decision is made at 732 as to whether the user is a bonded or non-bonded-line user. In the case of a non-bonded user, the data are decoded at 734 according to known methods for single-line data decoding. An error metric may be determined at 736 by comparing the data before and after the decoding operation. One or more of the various filters usable with embodiments of the present invention can then be updated at 750, if desired.

In the case of a bonded-user, a feedforward filter is applied to the data of all lines of the user at 738, after which each line's data undergo feedback filtering at step 740. The data of a line then are decoded at 742, and an error metric may be computed, if desired, at 744. A decision is made at 746 as to whether additional lines for the current bonded-line set user have to be decoded. If the data of all lines have not been decoded, then process 701 can return to 740 for the next line's data. Otherwise, one or more of the various filters usable with embodiments of the present invention can then be updated at 750, if desired.

As noted above, filtering and other modules can be optionally updated at 750 using the error metrics computed at 736 and/or 744. Operations performed at 738 and/or 740 also may be updated to reflect changes in the channel and/or the noise. When a controller is in use (for example, controller 690 of FIGS. 6A and/or 6B), the controller may assume the task of updating the programmable components of one or more modules used in these processes. After the optional updating 750, the process resets at 751, and the process recommences for the next tone or for the next DMT symbol at 730.

Various apparatus according to the present invention can implement one or more of the methods and/or techniques discussed above. According to one embodiment of the present invention shown in FIG. 8A, a nested vectoring control unit 800 may be part of an independent entity coupled to a DSL system, such as a controller 810 (for example, a device functioning as or with a DSL optimizer, DSM server, DSM Center or a dynamic spectrum manager) assisting users and/or one or more system operators or providers in operating and, perhaps, optimizing use of the system, including implementation of one or more tonal predictive GDFEs at one or more upstream receivers and/or one or more downstream transmitters implementing tonal preceding. (A DSL optimizer may also be referred to as a dynamic spectrum manager, Dynamic Spectrum Management Center, DSM Center, System Maintenance Center or SMC.) In some embodiments, the controller 810 may be a completely independent entity, while in other embodiments the controller 810 may be in or part of an ILEC or CLEC operating a number of DSL lines from a CO or other location. As seen from the dashed line 846 in FIG. 8A, the controller 810 may be in the CO 146 or may be external and independent of CO 146 and any company operating within the system. Moreover, controller 810 may be coupled to, communicating with and/or controlling DSL and/or other communication lines in multiple COs.

In some embodiments of the present invention, the controller 810 controls and/or communicates with a vectored DSL system in a specific binder, for example communicating with one or more upstream receivers. The DSL lines in the binder may be ADSL, VDSL and/or other communication lines in various combinations. The nested vectoring control unit 800 has access (directly or indirectly) to information and/or data regarding the various lines in the subject binder and may be able to control certain aspects of those lines' operation. For example, the nested vectoring control unit 800 may initially set and/or update the Q, Q*, F*, $A^{-1}$, $S^{-1}$ and/or G matrices (and/or others) in one or more receivers or receiver modules, one or more transmitters or transmitter modules, etc., such as those shown in the Figures. Also, the nested vectoring control unit 800 may enable and/or disable operation of a tonal predictive GDFE and/or tonal precoder, as appropriate.

Figure 8A:
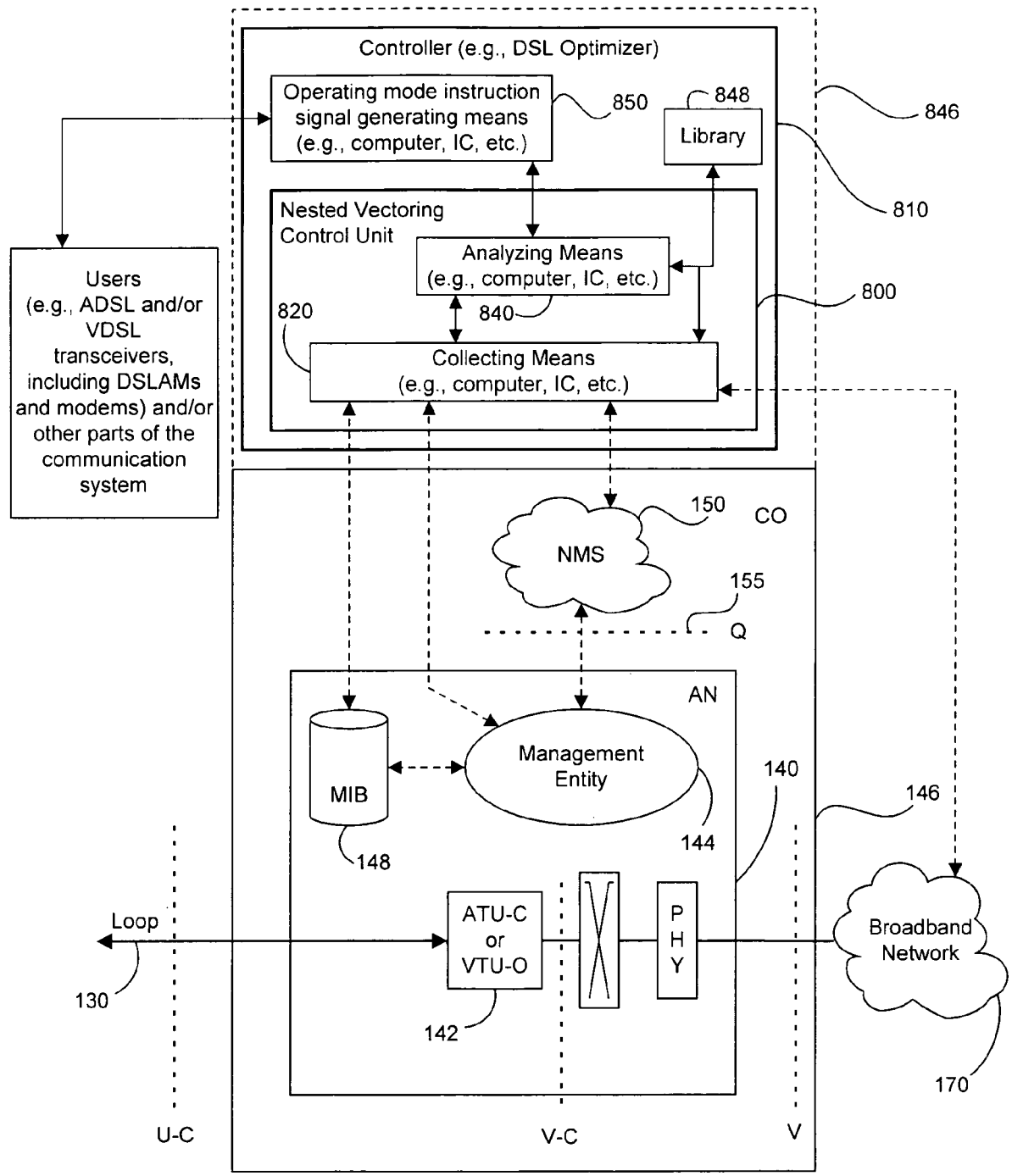
FIG. 8A is a controller including a nested vectoring control unit according to one embodiment of the present invention.

The nested vectoring control unit 800 includes a data collection unit 820 identified as a collecting means and an analysis unit 840 identified as analyzing means. As seen in FIG. 8A, the collecting means 820 (which can be a computer, processor, IC, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the nested vectoring control unit 800 to collect operational data from the system (for example, to be used in generating and/or updating one or more matrices, and/or data used with complex rotor units, used in a tonal predictive GDFE and/or tonal precoder). Data may be collected once or over time. In some cases, the collecting means 820 will collect on a periodic basis, though it also can collect data on-demand or any other non-periodic basis, thus allowing the nested vectoring control unit 800 to update its information, operation, etc., if desired.

In the exemplary system of FIG. 8A, the analyzing means 840 (which also can be a computer, processor, IC, computer module, etc. of the type generally known) is coupled to a DSLAM, modem and/or system operating signal generating means 850 inside or outside the controller 810. This signal generator 850 (which can be a computer, processor, IC, computer module, etc.) is configured to generate and send instruction signals to modems and/or other components of the communication system (for example, ADSL and/or VDSL transceivers and/or other equipment, components, etc. in the system). These instructions may include commands adaptively turning on and off a tonal predictive GDFE or tonal precoder, ordering, loading, nesting functions, requesting new and/or updated channel crosstalk and insertion loss information, and requesting and providing data relating to matrices and/or any other operational characteristics of the relevant communication lines.

Embodiments of the present invention can utilize a database, library or other collection of data pertaining to the data collected, past operation of the vectored DSL system and any other relevant lines and equipment. This collection of reference data may be stored, for example, as a library 548 in the controller 810 of FIG. 8A and used by the analyzing means 840 and/or collecting means 820. The controller 810 also may access one or more libraries and/or databases outside the controller 810, as will be appreciated by those skilled in the art.

In various embodiments of the invention, the vectoring control unit 800 may be implemented in one or more computers such as PCs, workstations or the like. The collecting means 820, analyzing means 840 and/or signal generating means 850 may be software modules, hardware modules or a combination of both, as will be appreciated by those skilled in the art. When working with a large numbers of modems, databases may be introduced and used to manage the volume of data collected.

Figure 8B:
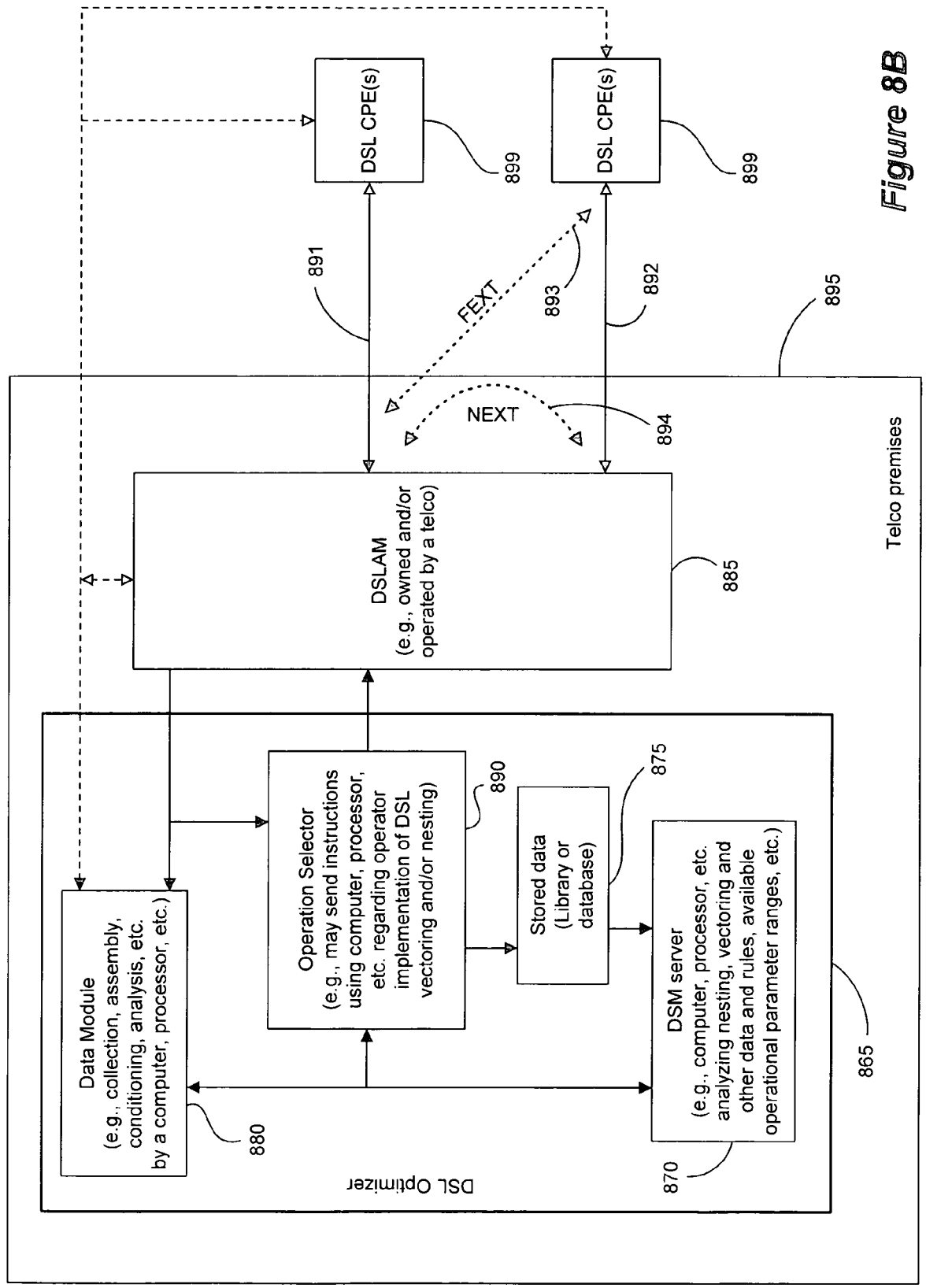
FIG. 8B is a DSL optimizer according to one embodiment of the present invention.

Another embodiment of the present invention is shown in FIG. 8B. A DSL optimizer 865 operates on and/or in connection with a DSLAM 885 or other DSL system component, either or both of which may be on the premises 895 of a telecommunication company (a "telco"). The DSL optimizer 865 includes a data module 880, which can collect, assemble, condition, manipulate and supply operational data for and to the DSL optimizer 865. Module 880 can be implemented in one or more computers such as PCs or the like. Data from module 880 is supplied to a DSM server module 870 for analysis (for example, evaluating the need for a GDFE in a given upstream-end receiver, evaluating channel-related matrices and/or other data used in a GDFE, performing similar functions in connection with a precoder, and coordinating ordering, loading, nesting functions, tonal rotors, etc.). Information also may be available from a library or database 875 that may be related or unrelated to the telco. Server 870 can be implemented in one or more computers and/or computer systems such as PCs or the like.

An operation selector 890 may be used to implement, modify and/or cease DSL and/or other communication operations, including implementation of various operational parameters involving transmit power, carrier masks, etc. Moreover, implementing embodiments of the present invention, selector 890 can send instructions regarding nesting-related functions, operation of a GDFE or precoder, and data and/or information to support such operations (for example, initial and/or updated matrix information, the PSDMASK and power levels for the users, etc.). Decisions may be made by the DSM server 870 or in any other suitable manner, as will be appreciated by those skilled in the art. Operational modes and/or parameters selected by selector 890 are implemented in the DSLAM 885 and/or any other appropriate DSL system component equipment. Such equipment may be coupled to DSL equipment such as customer premises equipment 899. The system of FIG. 8B can operate in ways analogous to the system of FIG. 8A, as will be appreciated by those skilled in the art, though differences are achievable while still implementing embodiments of the present invention.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 9:
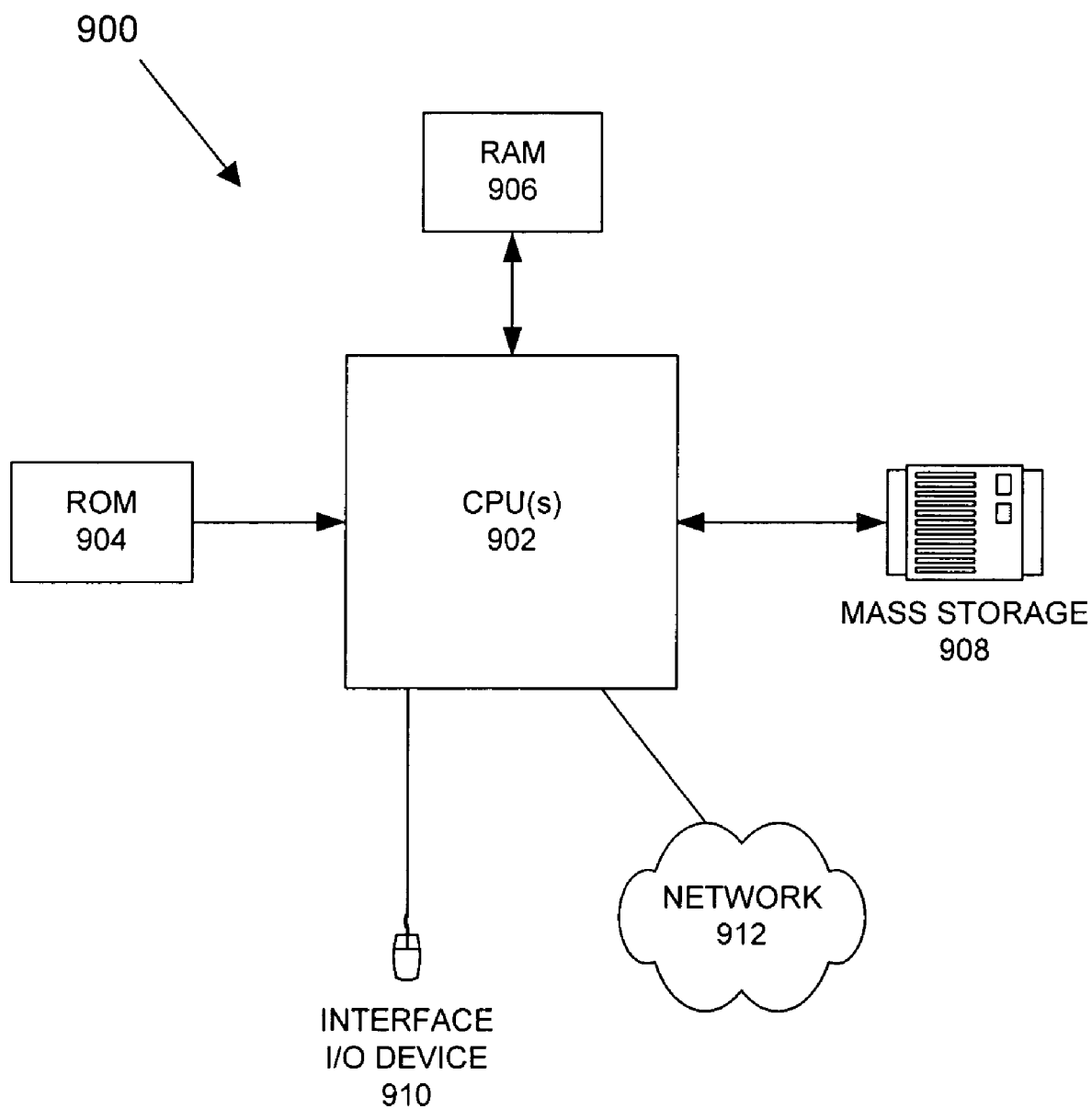
FIG. 9 is a block diagram of a typical computer system or integrated circuit system suitable for implementing embodiments of the present invention.

FIG. 9 illustrates a typical computer system that can be used by a user and/or controller in accordance with one or more embodiments of the present invention. The computer system 900 includes any number of processors 902 (also referred to as central processing units, or CPUs) that are coupled to storage devices including primary storage 906 (typically a random access memory, or RAM), primary storage 904 (typically a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described above. A mass storage device 908 also is coupled bi-directionally to CPU 902 and provides additional data storage capacity and may include any of the computer-readable media described above. The mass storage device 908 may be used to store programs, data and the like and is typically a secondary storage medium such as a hard disk that is slower than primary storage. It will be appreciated that the information retained within the mass storage device 908, may, in appropriate cases, be incorporated in standard fashion as part of primary storage 906 as virtual memory. A specific mass storage device such as a CD-ROM 914 may also pass data uni-directionally to the CPU.

CPU 902 also is coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 908 or 914 and executed on CPU 902 in conjunction with primary memory 906. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. In a Digital Subscriber Line (DSL) system comprising a plurality of DSL lines forming a DSL line set, wherein the DSL line set comprises a non-bonded-line subset and a bonded-line subset, a method comprising:
   performing a downstream data transmission operation comprising:
      block processing, via a nested vectoring control unit communicably interfaced with the DSL system, bonded-line data from the bonded-line subset prior to downstream transmission to generate processed bonded-line data;
      precoding, via the nested vectoring control unit, non-bonded-line data from the non-bonded-line subset and the processed bonded-line data to generate multi-user data for downstream transmission; and
      transmitting, via a transmitter, the multi-user data downstream.

2. The method of claim 1, wherein block processing the bonded-line data to generate processed bonded-line data comprises at least one of the following:
   performing one or more complex rotor operations on the bonded-line data; and
   applying matrix multiplication to the bonded-line data.

3. The method of claim 1, wherein precoding the non-bonded-line data and the processed bonded-line data to generate multi-user data comprises:
   feedback processing the non-bonded-line data and the processed bonded-line data to generate subtracted multi-user data; and
   block processing the subtracted multi-user data.

4. The method of claim 3, wherein block processing the subtracted multi-user data comprises at least one of the following:
   performing one or more complex rotor operations on the subtracted multi-user data; and
   applying matrix multiplication to the subtracted multi-user data.

5. The method of claim 1, further comprising: performing an upstream data reception operation.

6. The method of claim 5, wherein:
   transmitting the multi-user data downstream as part of the downstream data transmission operation comprises transmitting the multi-user data from a DSL communication component communicably interfaced with a downstream transmitter of the DSL system to a second DSL communication component communicably interfaced with a Customer Premises Equipment (CPE) of the DSL system ("CPE side"); and wherein
   performing the upstream data reception operation comprises receiving a second multi-user data at an upstream receiver of the DSL system from the CPE side.

7. The operation of claim 5, wherein performing the upstream data reception operation comprises:
receiving a second multi-user data;
decoding the received second multi-user data via block processing to generate processed received multi-user data; and
applying feedback processing to the processed received multi-user data to generate filtered received multi-user data.

8. The method of claim 7, further comprising:
performing one or both of the following data generation operations based on the filtered received multi-user data:
generating decoded non-bonded-line multi-user data from the filtered received multi-user data via a decision device when the filtered received multi-user data originates from the non-bonded-line subset, and
generating decoded bonded-line multi-user data from the filtered received multi-user data via a bonded-line processing unit when the filtered received multi-user data originates from the bonded-line subset.

9. The method of claim 8, wherein applying feedback processing to the processed received multi-user data to generate filtered received multi-user data comprises:
providing the decoded non-bonded-line multi-user data and the decoded bonded-line multi-user data as inputs to a feedback filtering module; and
subtracting output data of the feedback filtering module from the processed received multi-user data to generate filtered received multi-user data.

10. The method of claim 8, wherein generating the decoded bonded-line multi-user data from the filtered received multi-user data via the bonded-line processing unit comprises:
applying block processing to the filtered received multi-user data to produce processed bonded-line multi-user data; and
providing the processed bonded-line multi-user data to a decision device to yield the decoded bonded-line multi-user data.

11. The method of claim 7, further comprising one or more of the following operations:
updating the application of block processing to the received second multi-user data based on the error metrics; and
updating application of feedback processing to the processed received multi-user data based on the error metrics.

12. The method of claim 10, further comprising: updating the application of block processing to the filtered received multi-user data based on error metrics.

13. The method of claim 10, wherein applying block processing to the filtered received multi-user data to produce processed bonded-line multi-user data comprises at least one of the following:
performing one or more complex rotor operations on the filtered received multi-user data; and
applying matrix multiplication to the filtered received multi-user data.

14. The method of claim 11, further comprising: receiving the error metrics from a controller device communicably interfaced with the DSL system, wherein the controller device monitors for the error metrics as computed by one or more receivers communicably interfaced with the DSL system.

15. The method of claim 1, wherein the DSL system comprises a one-sided multi-user vectored DSL system.

16. A controller device communicably interfaced with a Digital Subscriber Line (DSL) system in which a plurality of DSL lines of the DSL system form a DSL line set comprising a non-bonded-line subset and a bonded-line subset, wherein the controller device comprises:
a nested vectoring control unit to:
block process bonded-line data from the bonded-line subset prior to downstream transmission to generate processed bonded-line data, and
precode non-bonded-line data from the non-bonded-line subset and the processed bonded-line data to generate multi-user data for downstream transmission; and
a transmitter to transmit the multi-user data downstream.

17. The controller device of claim 16, further comprising:
a receiver to receive second multi-user data transmitted upstream; and
an upstream multi-user data processing unit to:
decode the received second multi-user data via block processing to generate processed received multi-user data, and
apply feedback processing to the processed received multi-user data to generate filtered received multi-user data.

18. A computer readable medium having instructions stored thereon that, when executed by a communication component in a Digital Subscriber Line (DSL) system (DSL system) comprising a plurality of DSL lines forming a DSL line set, wherein the DSL line set comprises a non-bonded-line subset and a bonded-line subset, the instructions cause the communication component to perform a method comprising:
performing a downstream data reception operation comprising:
receiving multi-user data transmitted downstream, the multi-user data having first data originating from the non-bonded-line subset and second data originating from the bonded-line subset;
decoding the received multi-user data via block processing to generate processed received multi-user data;
applying feedback processing to the processed received multi-user data to generate filtered received multi-user data;
generating decoded non-bonded-line multi-user data from the filtered received multi-user data via a decision device for the filtered received multi-user data that originates from the non-bonded-line subset; and
generating decoded bonded-line multi-user data from the filtered received multi-user data via a bonded-line processing unit for the filtered received multi-user data that originates from the bonded-line subset.

19. The computer readable medium of claim 18, wherein the method further comprises:
performing an upstream data transmission operation.

20. The computer readable medium of claim 19, wherein:
performing the downstream data reception operation comprises receiving the multi-user data at the DSL communication component communicably interfaced with a Customer Premises Equipment (CPE) of the DSL system ("CPE side") from a second DSL communication component communicably interfaced with a downstream transmitter of the DSL system; and wherein
performing the upstream data transmission operation comprises transmitting a second multi-user data from the CPE side to an upstream receiver of the DSL system.

21. The computer readable medium of claim 18, wherein applying feedback processing to the processed received multi-user data to generate filtered received multi-user data comprises:
- providing the decoded non-bonded-line multi-user data and the decoded bonded-line multi-user data as inputs to a feedback filtering module; and
- subtracting output data of the feedback filtering module from the processed received multi-user data to generate filtered received multi-user data.

22. The computer readable medium of claim 18, wherein generating the decoded bonded-line multi-user data from the filtered received multi-user data via the bonded-line processing unit comprises:
- applying block processing to the filtered received multi-user data to produce processed bonded-line multi-user data; and
- providing the processed bonded-line multi-user data to a decision device to yield the decoded bonded-line multi-user data.

23. The computer readable medium of claim 22, wherein applying block processing to the filtered received multi-user data to produce processed bonded-line multi-user data comprises at least one of the following:
- performing one or more complex rotor operations on the filtered received multi-user data; and
- applying matrix multiplication to the filtered received multi-user data.

24. The computer readable medium of claim 19, wherein performing the upstream data transmission operation comprises:
- block processing bonded-line data from the bonded-line subset prior to upstream transmission to generate processed bonded-line data;
- precoding non-bonded-line data from the non-bonded-line subset and the processed bonded-line data to generate second multi-user data for upstream transmission; and
- transmitting the second multi-user data upstream.

25. The computer readable medium of claim 24, wherein block processing the bonded-line data to generate processed bonded-line data comprises at least one of the following:
- performing one or more complex rotor operations on the bonded-line data; and
- applying matrix multiplication to the bonded-line data.

26. The computer readable medium of claim 24, wherein precoding the non-bonded-line data and the processed bonded-line data to generate the second multi-user data comprises:
- feedback processing the non-bonded-line data and the processed bonded-line data to generate subtracted multi-user data; and
- block processing the subtracted multi-user data.

27. The computer readable medium of claim 26, wherein block processing the subtracted multi-user data comprises at least one of the following:
- performing one or more complex rotor operations on the subtracted multi-user data; and
- applying matrix multiplication to the subtracted multi-user data.

28. A controller communicably interfaced with a Digital Subscriber Line (DSL) system in which a plurality of DSL lines of the DSL system form a DSL line set comprising a non-bonded-line subset and a bonded-line subset, wherein the controller comprises:
- a receiver to receive multi-user data transmitted downstream, the multi-user data having first data originating from the non-bonded-line subset and second data originating from the bonded-line subset;
- a decoder to decode the received multi-user data via block processing to generate processed received multi-user data;
- a feedback filter to apply feedback processing to the processed received multi-user data to generate filtered received multi-user data;
- a decision device to generate decoded non-bonded-line multi-user data from the filtered received multi-user data that originates from the non-bonded-line subset; and
- a bonded-line processing unit generate decoded bonded-line multi-user data from the filtered received multi-user data that originates from the bonded-line subset.

29. The controller of claim 28, further comprising: a transmission device to perform an upstream data transmission operation.

30. The controller of claim 28, wherein:
- the controller to operate within a DSL communication component at a Customer Premises Equipment (CPE) of the DSL system ("CPE side") and wherein the receiver to receive the multi-user data transmitted downstream comprises the CPE side to receive the multi-user data from a second DSL communication component communicably interfaced with a downstream transmitter of the DSL system; and wherein
- the transmission device to perform the upstream data transmission operation comprises the transmission device to transmit a second multi-user data from the CPE side to an upstream receiver of the DSL system.

* * * * *